(12) United States Patent
Horwitz et al.

(10) Patent No.: US 7,157,022 B2
(45) Date of Patent: Jan. 2, 2007

(54) MULTIVALENT METAL ION EXTRACTION USING DIGLYCOLAMIDE-COATED PARTICLES

(75) Inventors: E. Philip Horwitz, Naperville, IL (US); Richard E. Barrans, Jr., Downers Grove, IL (US); Andrew H. Bond, Hoffman Estates, IL (US)

(73) Assignee: .PG Research Foundation, Inc., Darien, IL (US)

( * ) Notice: Subject to any disclaimer, the term of this patent is extended or adjusted under 35 U.S.C. 154(b) by 618 days.

(21) Appl. No.: 10/351,717

(22) Filed: Jan. 27, 2003

(65) Prior Publication Data

US 2004/0062695 A1 Apr. 1, 2004

Related U.S. Application Data

(63) Continuation-in-part of application No. 10/261,031, filed on Sep. 30, 2002.

(51) Int. Cl.
*C01B 31/00* (2006.01)
*B01D 15/00* (2006.01)

(52) U.S. Cl. .............. 252/184; 423/2; 423/6; 423/7; 423/21.5; 423/24; 423/100; 423/157; 210/656; 210/679

(58) Field of Classification Search .......... 252/184; 423/DIG. 14, 21.5, 6, 7, 24, 100, 157, 2; 210/656, 679
See application file for complete search history.

(56) References Cited

U.S. PATENT DOCUMENTS

| | | | |
|---|---|---|---|
| 4,548,790 A | 10/1985 | Horwitz et al. | |
| 4,574,072 A | 3/1986 | Horwitz et al. | |
| 4,835,107 A | 5/1989 | Horwitz et al. | |
| 5,100,585 A | 3/1992 | Horwitz et al. | |
| 5,110,474 A | 5/1992 | Horwitz et al. | |
| 5,346,618 A | 9/1994 | Horwitz et al. | |
| 5,368,736 A | 11/1994 | Horwitz et al. | |

FOREIGN PATENT DOCUMENTS

EP 973033 * 1/2000

OTHER PUBLICATIONS

Translation of EP 973033, Jan. 2000.*
Tohda, et al., "Ion-selective charge separation at . . . " J. of Molecular Structure, 408/409, pp. 155-160, 1997, no month.*
Chemical Abstracts Registry Nos. 126572-74-5 and 74267-27-9, no date.*
Ermolenko, et al., "Technology of photocurable . . . LAPS" Chemical Sensors, vol. 17, Supplement B, pp. 66-68, 2001, no month.*
Benzi et al., "Radium Removal from Aqueous Solutions by Variously Supported Ligands", *J. Radioanal. Nucl. Chem.*, Letters (1992) 164(4):211-220.
Casas et al., "Extraction of Cadmium(II) by Mixtures of Organophosphorus Compounds", *Polyhedrom* (1989) 8(21):2535-2541.
Cortina et al., Solvent Impregnated Resins Containing Di(2-Ethyl-Hexyl) Phosphoric Acid. II. Study of the Distribution Equilibria of Zn(II), Cu(II) and Cd(II):, *Solvent Extr. Ion Exch.* (1994) 12(2):371-391.
Dietz et al., "An Improved Method for the Separation of Lead-210 from Ra-DEF for Radioactive Equilibrium Experiments", *J. Chem. Ed.* (Feb. 1996) 73(2):182-184.
Horwitz, et al., "Separation and Preconcentration of Strontium from Biological, Environmental, and Nuclear Waste Samples by Extraction Chromatography Using a Crown Ether.", *Anal. Chem.* (1991) 63:522-525.
Kimura et al., "Extraction Chromatography in the TBP-$HNO_3$ System", *J. of Radioanalytical and Nuclear Chemistry, Articles* (1990) 141(2):295-306.
Miralles et al., "Solvent Extraction of Zinc(II) by Organophosphorus Acids Compounds from Perchlorate Solutions", *Solvent Extr. Ion Exch.* (1992) 10(1):51-68.
Parrish, "Measurement of Water Regain and Macropore Volume of Ion-Exchange Resin", *J. Appl. Chem.* (Jun. 1965) 15:280-288.
Parrish, "Macroporous Resins as Supports for a Chelating Liquid Ion-Exchanger in Extraction Chromatography", *Anal. Chem.* (Jul. 1977) 49(8):1189-1192.
Ramanujam et al., "Extraction Chromatographic Separation of Promethium From High Active Waste Solutions of Purex Origin", *Solvent Extr. Ion Exch.* (1995) 12(2):301-312.
Rydberg, et al., Eds., *Principles and Practices of Solvent Extraction*, Marcel Dekker (New York: 1992), pp. 416-417.
Sasaki et al., "Extraction of Actinides(III), (IV), (V), (VI), and Lanthanides(III) by Structurally Tailored Diamides", *Solvent Extr. Ion Exch.* (2002) 20(1):21-34.
Sasaki et al., "The Novel Extractants Diglycolamides, for the Extraction of Lanthanides and Actinides in $HNO_3$-n-Dodecane System", *Solvent Extr. Ion Exch.* (2001) 19(1):91-103.
Sekine, et al., Eds., *Solvent Extraction Chemistry: Fundamentals and Applications*, Marcel Dekker (New York: 1977), pp. 628-629.

* cited by examiner

*Primary Examiner*—Steven Bos
(74) *Attorney, Agent, or Firm*—Welsh & Katz, Ltd

(57) ABSTRACT

A separation medium, a method for using that separation medium and an apparatus for selectively extracting multivalent cations such as pseudo-lanthanide, prelanthanide, lanthanide, preactinide or actinide cations from an aqueous acidic sample solution is described. The separation medium is preferably free-flowing and comprises particles having a diglycolamide (DGA) extractant dispersed onto an inert, porous support.

12 Claims, 11 Drawing Sheets

MULTIVALENT METAL ION EXTRACTION USING DIGLYCOLAMIDE-COATED PARTICLES

CROSS-REFERENCE TO RELATED APPLICATION

This is a continuation-in-part of application Ser. No. 10/261,031 filed Sep. 30, 2002.

TECHNICAL FIELD

The present invention is concerned generally with a method, separation medium and apparatus for selectively extracting multivalent cations from acidic aqueous solutions. More particularly, the invention is concerned with a separation medium that is preferably free-flowing and is comprised of a diglycolamide dispersed onto an inert substrate material, a method for using that separation medium and an apparatus for selectively extracting multivalent cations from an acidic aqueous sample.

BACKGROUND OF THE INVENTION

The wide-scale use of nuclear technology in power production and in nuclear weapons manufacturing has necessitated the periodic monitoring of biological and environmental samples for the presence of selected elements such as strontium (Sr), cerium (Ce), europium (Eu), actinium (Ac), thorium (Th), uranium (U,) neptunium (Np), plutonium (Pu), americium (Am), and curium (Cm), and for monitoring particular nuclides such as $^{90}$Sr, $^{144}$Ce, and $^{152,154}$Eu. There is, therefore, a clear need for an analytical procedure and methodology suitable for use in the routine monitoring of persons whose activities expose them to the risk of internal contamination from these elements and for the determination of the levels of radionuclides in various environmental samples (e.g., soils, plants, natural waters, and waste streams). A number of procedures for the selective recovery of the above elements have been disclosed.

U.S. Pat. No. 4,548,790 dated Oct. 22, 1985 describes a group of neutral bifunctional organophosphorus compounds broadly described as alkyl (phenyl)-N,N-dialkylcarbamoyl-methylphosphine oxides (hereinafter referred to as CMPO) that are useful for the recovery of actinide and lanthanide cations from acidic solutions. The combination of the CMPO with a phase modifier such as tri-n-butyl phosphate (hereinafter referred to as TBP) in a normal paraffin hydrocarbon diluent is described in U.S. Pat. No. 4,574,072 dated Mar. 4, 1986.

U.S. Pat. No. 4,835,107 dated Oct. 21, 1986 describes a method for the concentration and separation of actinide cations from biological and environmental samples using CMPO and TBP in a chromatographic mode. The CMPO/TBP chromatographic system was applied in the recovery and purification of yttrium-90 for medical applications described in U.S. Pat. No. 5,368,736 dated Nov. 29, 1994. Other systems utilizing monofunctional, as well as bifunctional, organophosphorus extractants in the recovery of lanthanide and actinide cations from acidic media in both the liquid-liquid extraction mode and in the extraction chromatographic mode are described in Kimura (1990) *J. Radioanal. Nucl. Chem.*, 141, 295 and Ramanujam et al. (1995) *Solvent Extr. Ion Exch.*, 13(2), 301–312.

U.S. Pat. Nos. 5,100,585, 5,110,474 and 5,346,618 by some of the present inventors teach the manufacture and use of a chromatographic medium for selectively separating strontium or technetium cations from acidic compositions from various sources. The solid phase chromatographic medium made and used in those patents comprised a solution of a Crown ether dissolved in a diluent that was slightly soluble or insoluble in water, but capable of dissolving a substantial quantity of water, such as octanol, which solution was itself dispersed onto a solid inert resin substrate material.

A few years after the filing of the applications that became the above U.S. patents, Benzi et al. (1992) *J. Radioanal. Nucl. Chem., Letters*, 164(4):211–220 reported on the use of 18-Crown-6 (18C6), dibenzo-18-Crown-6 (DB18C6) and 24-Crown-8 (24C8) as well as open chain ligands (podands) adsorbed on Amberlite® XAD-4 and XAD-7 resins or Kieselgel as supports for removal of radium cations from aqueous solutions. Those authors reported the supported crown ethers to be inefficient for that extraction, whereas the supported open chain ligands were said to provide satisfactory distribution coefficients for the removal of radium.

The above-noted patents of some of the present inventors provided a large technological advance over the liquid-liquid separation techniques that preceded them, and from which their technical advance grew. However, the separation medium of those patents exhibited changes upon elution of the captured strontium cations that minimized their usefulness for a subsequent separation, including loss of diluent to the effluent medium. Still further, the amount of strontium cation-extracting Crown ether present on any given support was limited because of the presence of the diluent.

All of the prior methods suffer from one or more major disadvantages. Foremost among these is that the retention of the trivalent lanthanides and actinides in acidic aqueous nitric and hydrochloric acid is limiting and the subsequent recovery in dilute acid is difficult, especially in the case of tetra- and hexavalent actinides. In the chromatographic mode, low retention of the analyte in the column loading step results in its early breakthrough in the column effluent. Early breakthrough frequently results in losses of analyte and insufficient purification because of limited column rinsing capabilities.

In recent years, the wide-scale use of nuclear technology has also expanded greatly in the field of medicine. The use of radioactive materials in diagnostic medicine is now readily accepted because these procedures are safe, minimally invasive, cost-effective, and they provide unique information that is otherwise unavailable to the clinician. More recently, radioactive isotopes are being used to treat disease as opposed to diagnosing disease. This technique is referred to as radioimmunotherapy (RIT). The U.S. Food and Drug Administration (FDA) has approved the use of the first RIT drug that relies on radioactive decay to impart the cytotoxic effect to the disease site.

The FDA has mandated rigorous purity requirements for radionuclides used for therapeutic applications. Foremost among these requirements is high radionuclidic purity, which stems directly from the hazards associated with the introduction of long-lived or high-energy radioactive impurities into a patient. Chemical purity is also vital to a safe and efficient medical procedure because the radionuclide must generally be bonded to a biolocalizing agent prior to use. Biolocalizing agents have extremely low capacities for metal ions and, therefore, the presence of ionic interferents can inhibit the uptake of the medically useful radionuclide. Another critical factor in bonding the radionuclide to the biolocalizing agent is obtaining the desired purified radionuclide in a dilute $\leq 0.1$ M acidic (usually HCl) aqueous solution. A number of pseudo-lanthanide, prelanthanide, lanthanide, preactinide and actinide nuclides are candidates for use in radioimmunotherapy; for example, $^{47}$SC, $^{90}$Y, $^{149}$Pm, $^{153}$Sm, $^{153}$Gd, $^{166}$Ho, $^{177}$Lu, $^{225}$Ac, and $^{255}$Fm.

In related studies, Sasaki et al. [Sasaki et al. (2001) Solvent Extr. Ion Exch., 19(1):91–103; and Sasaki et al. (2002) Solvent Extr. Ion Exch., 20(1):21–34. See also the web site of the Japanese Atomic Energy Research Institute (JAERI) and Japanese Kokai No. 2002-1007 and No. 2002-243890.] have published results on the liquid-liquid extraction of trivalent lanthanides and tri-, tetra-, and hexavalent actinides with structurally tailored diamides including selected diglycolamides. However, these studies were carried out using very dilute solutions of the extractants in nitrobenzene, chloroform, toluene, hexane, or n-dodecane. The aqueous phase was primarily nitric acid or 0.1 M sodium perchlorate and, in the case of trivalent lanthanides and actinides, never exceeded 1 M in concentration. Extrapolation of these data to a useful extraction chromatographic system that can achieve the objectives cited herein cannot be done.

It has been demonstrated in related studies by Cortina et al. (1994) Solvent Extr. Ion Exch., 12(2):371–391, that quantitative predictions of metal ion uptake from liquid-liquid extraction data cannot be extended to extraction chromatographic systems. These studies have shown that the selectivity order for the extraction of Cu and Cd (Cu greater than Cd) by bis-2-ethylhexyl phosphoric acid (HDEHP) is reversed for the solid supported reagent. Studies by Miralles et al. (1992) Solvent Extr. Ion Exch. 10(1):51–68 and Casas et al. (1989) Polyhedron 8:2535 have shown that the nature of the metal species extracted by HDEHP in toluene or paraffinic hydrocarbons is somewhat different from the same extractant sorbed on Amberlite® XAD-2. The extracted species is typically less solvated in the extraction chromatographic system than in the liquid-liquid extraction system. None of the above observations are surprising because the film thickness of an extractant sorbed on a porous solid support having a surface area of 400 to 500 m$^2$/g, for example Amberchrom® CG-71, and containing 40 weight percent of an extractant with a density of 0.95 g/mL is only about 1 to 2×10$^{-3}$ μm. It is not, therefore, unexpected that the physical and chemical properties of the extractant and the concomitant extraction behavior in extraction chromatographic resins are different than in a liquid-liquid extractant system.

It would therefore be beneficial to provide a method, separation medium and apparatus for separating multivalent cations from acidic aqueous samples such as biological, commercial waste and environmental samples that do not exhibit the negative attributes of the prior technologies. The method, separation medium and apparatus of the present invention that are described hereinafter can overcome those negative attributes, while maintaining the previously achieved advances.

BRIEF SUMMARY OF THE INVENTION

The present invention contemplates a separation medium, an apparatus for carrying out a separation such as a chromatographic column or cartridge containing the separation medium, and a method of using the separation medium to separate a preselected multivalent metal cation such as a pseudo-lanthanide [e.g., scandium(III) and yttrium(III)], a prelanthanide [lanthanum(III)], a lanthanide, a preactinide [actinium(III)] or an actinide cation, like trivalent americium (Am$^{3+}$), yttrium (Y$^{3+}$) and ytterbium (Yb$^{3+}$) cations from other cations such as radium (Ra$^{2+}$) cations present in an acidic aqueous solution. A contemplated preselected multivalent metal cation, other than cadmium, typically has a crystal ionic radius in Ångstrom units of about 0.8 to about 1.2. The separation medium comprises particles having a diglycolamide (DGA) extractant dispersed onto an inert, porous support such as polymeric resin or silica particles. The separation medium is preferably free of an organic diluent, although such a diluent can be present. A contemplated diglycolamide extractant corresponds in structure to Formula I

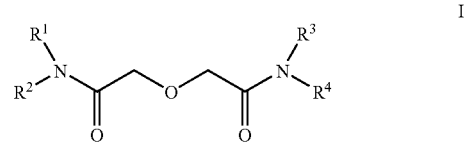

wherein R$^1$, R$^2$, R$^3$ and R$^4$ are the same or different and are hydrido (hydrogen) or hydrocarbyl groups such that R$^1$+R$^2$+R$^3$+R$^4$ contains about 14 to about 56 carbon atoms, and preferably about 16 to about 40 carbon atoms. More preferably each of R$^1$, R$^2$, R$^3$ and R$^4$ is a hydrocarbyl group. Most preferably, each of R$^1$, R$^2$, R$^3$ and R$^4$ is the same hydrocarbyl group.

A method for separating a predetermined multivalent cation having a crystal ionic radius of about 0.8 to about 1.2 Ångstroms (Å) from an aqueous sample that contains additional mono- or multivalent metal cations, or both, is also contemplated. The aqueous sample also contains a salting out amount of one or more salting out agents for a neutral extractant such as high concentrations of nitric, hydrochloric, perchloric, or the like acids, or lithium nitrate, aluminum nitrate, lithium chloride or the like.

That method includes the steps of contacting an above-described diglycolamide-containing separation medium with an aqueous sample containing dissolved multivalent cations, including the predetermined multivalent cation. That contact is maintained for a time period sufficient for the multivalent cations to be extracted from the sample solution to the separation medium to form a solid phase-loaded separation medium and a liquid phase multivalent cation-depleted sample. The solid and liquid phases are thereafter separated. The multivalent cation is thereafter preferably eluted by contacting the loaded separation medium with water or dilute hydrochloric or nitric acids.

A separation apparatus for extracting multivalent cations from an acidic aqueous solution comprising the above separation medium in a support vessel is also contemplated. A contemplated apparatus has a fluid inlet and fluid outlet and one or more porous supports within the vessel for maintaining the separation medium in a desired position. A contemplated support vessel is typically glass or plastic such as polyethylene or polypropylene and is typically a chromatographic column or cartridge.

The present invention has several benefits and advantages.

One benefit of the invention is provision of a novel extraction chromatographic material for the separation of multivalent cations such as those of Sc, Y, and lanthanides and actinides from biological, environmental and strongly acidic solution samples that contain other metal cations and for use in nuclear medicine.

An advantage of the invention is the provision of an improved material for sorption of the above multivalent cations on a support from (a) strongly acidic nitric acid solution and the provision for recovering (stripping) those cations in dilute nitric acid solution, as well as sorption from (b) strongly acidic hydrochloric acid solution and the provision for recovering (stripping) of those cations in a dilute hydrochloric acid solution, and sorption from (c) from strongly acidic nitric acid solution and recovering those cations in a dilute hydrochloric acid solution.

Another benefit of the invention is the provision of an improved material for the sorption of those multivalent cations on an extraction medium from an aqueous solution of nitrate or chloride salting out agent salts such as lithium nitrate or chloride and aluminum nitrate and recovering those cations in dilute hydrochloric and nitrate acid solutions.

Another advantage of the present invention is the unexpected difference in $D_w$ values observed for separation media between 0.1 and 3 M nitric or hydrochloric acids for particular trivalent metal cations when using a diglycolamide extractant having four 2-ethylhexyl amido nitrogen substituents as compared to a diglycolamide extractant having four n-octyl substituents.

Still further benefits and advantages will be apparent to the skilled worker from the disclosure that follows.

BRIEF DESCRIPTION OF THE DRAWINGS

In the drawings forming a portion of this disclosure, and in which like last two digit numbers indicate like structures.

DETAILED DESCRIPTION OF THE INVENTION

Figure 1:
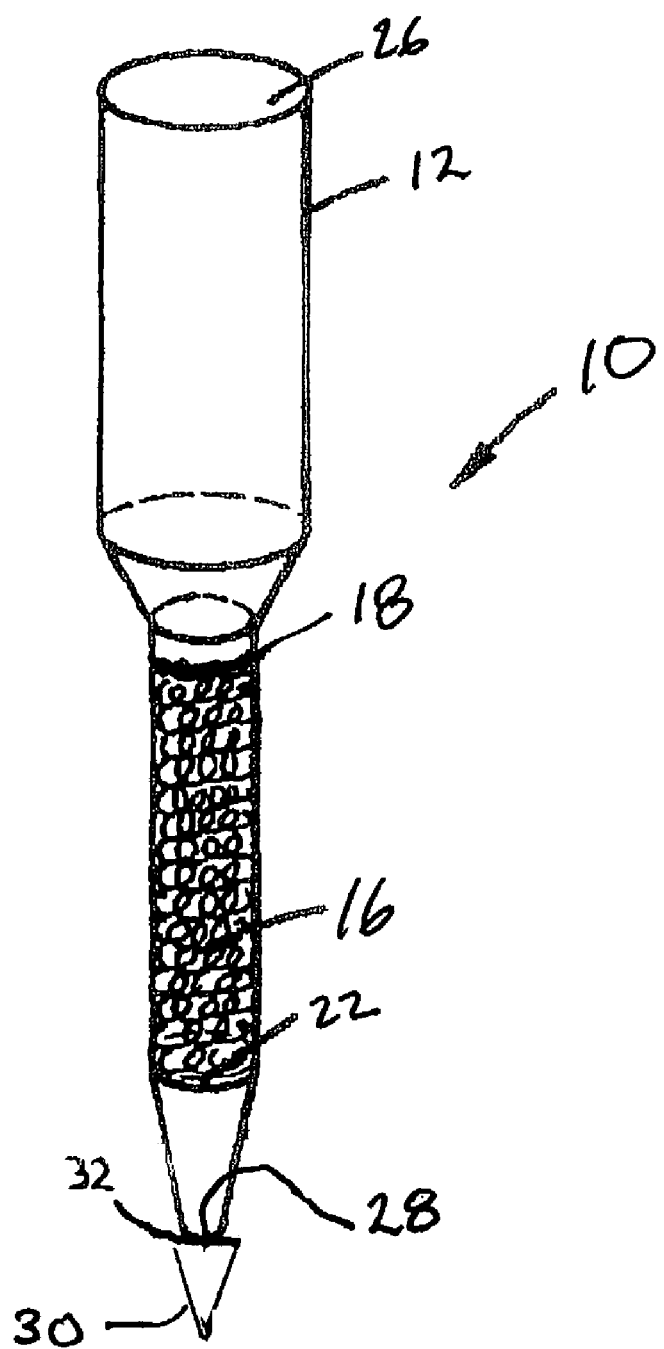
FIG. 1 shows a schematic representation of a separation vessel useful in an embodiment of the invention.

The present invention contemplates separation of a polyvalent metal cation from an aqueous sample composition. A contemplated multivalent metal cation typically exhibits a valence of +3, +4 or +6, although some +2 cations can also be selectively separated. A more convenient way to generically characterize a contemplated cation is by its valence in aqueous solution being +2 or greater and exhibiting a crystal ionic radius of about 0.8 to about 1.2 Ångstroms (Å), and more preferably about 0.9 to about 1.2 Å. All of the multivalent cations examined thus far, with the exception of cadmium, that exhibit the above crystal ionic radius selectively bind to a contemplated separation medium.

Aside from cadmium, the size to capacity for separation on a contemplated separation medium works for the almost twenty multivalent cations studied thus far. Crystal ionic radii can be obtained from a table in the Handbook of Chemistry and Physics, 54$^{th}$ ed., CRC Press, Cleveland Ohio, pages F-194-F195 (1964).

A contemplated multivalent cation is present in an aqueous sample that contains one or both of a monovalent cation and a multivalent cation. The aqueous sample also contains a salting out amount of one or more salting out agents for a neutral extractant such as high concentrations of nitric, hydrochloric, perchloric acids or the like or lithium nitrate, aluminum nitrate, lithium chloride or the like, as are known in the art. Thus, the salting out agent facilitates anion transport with the separated multivalent cations from the aqueous phase to the contemplated separation medium. Exemplary salting out amounts are illustrated hereinafter and include concentrations of acid of about 0.1 M to concentrated, but are more usually about 4 to about 8 M, with nitric acid being a preferred salting out agent. Lithium nitrate and lithium chloride are typically used at about 0.5 M to their respective solubility limits, whereas aluminum nitrate is typically used at about 0.2 M to its solubility limit.

A contemplated separation medium that can be used to bind multivalent cations such as the pseudo-lanthanide, prelanthanide, lanthanide, preactinide or actinide cations in the presence of one or both of multivalent and monovalent cations is comprised of a diglycolamide (DGA) extractant dispersed on inert solid phase support particles. A contemplated diglycolamide extractant corresponds in structure to Formula I

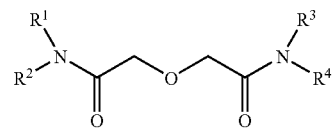

wherein $R^1$, $R^2$, $R^3$ and $R^4$ are the same or different and are hydrido (hydrogen) or hydrocarbyl groups such that $R^1+R^2+R^3+R^4$ contains about 14 to about 56 carbon atoms. Preferably, $R^1+R^2+R^3+R^4$ contains about 16 to about 40 carbon atoms. More preferably each of $R^1$, $R^2$, $R^3$ and $R^4$ is a hydrocarbyl group. Most preferably, each of $R^1$, $R^2$, $R^3$ and $R^4$ is the same alkyl, hydrocarbyl group.

The word "hydrocarbyl" is defined to include straight and branched chain aliphatic as well as alicyclic groups or radicals that contain only carbon and hydrogen. Thus, alkyl, alkenyl and alkynyl groups are contemplated, as are aromatic hydrocarbons such as phenyl and naphthyl groups, and aralkyl groups such as benzyl and phenethyl groups. Where a specific hydrocarbyl substituent group is intended, that group is recited; that is, $C_1$–$C_4$ alkyl, methyl or dodecenyl. Exemplary hydrocarbyl groups contain a chain of 1 to about 18 carbon atoms, and preferably two to about 10 carbon atoms.

A particularly preferred hydrocarbyl group is an alkyl group. Illustrative alkyl groups include methyl, ethyl, propyl, iso-propyl, butyl, hexyl, octyl, nonyl and decyl groups. Particularly preferred alkyl groups are the n-octyl and the 2-ethylhexyl groups.

A contemplated separation medium comprises a diglycolamide extractant coated on inert, solid phase support particles. Contemplated solid phase support particles are inert in that they do not react with the aqueous acid, such as the aqueous nitric acid that is present in a contemplated separation, or with the extractant.

A contemplated inert, porous support is itself preferably free-flowing when dry, and can be made of a variety of materials, including silica and polymeric resin as known in the art for use in a chromatographic column. By "free-flowing", it is meant that the support and separation medium are pourable particles that are free from substantial clumping. Thus, for example, a beaker of dry contemplated support particles or dry separation medium particles pours much like dry silica gel powder used for column chromatography.

Exemplary silica-based support particles are available from Sigma Chemical Co. (St. Louis, Mo.) under the designation controlled-pore glass and controlled-pore glyceryl-glass. These materials are available in varying mesh sizes from 20–80 to 200–400 and in varying nominal pore sizes from 75 through 3000 Å. Useful trimethylsilyl-bonded porous silica particles are available from Alltech Associates, Deerfield, Ill. These particles have a nominal pore size of 300 Å and are available in 90–130, 20–50 and 35–70 micron diameters.

Exemplary useful polymeric resins include the Amberlite® polyaromatic resins such as those sold under the designations XAD-4, XAD-8, XAD-11 and XAD-16, and the acrylic resin sold under the designation XAD-7 by Rohm and Haas Co., Philadelphia, Pa. and are available in 20–60 mesh size. These resin particles are said to have the following average pore diameters and surface areas: XAD-4 40 Å and 725 $m^2$/g; XAD-7 90 Å and 450 $m^2$/g; XAD-16 100 Å and 800 $m^2$/g, and are referred to in the art as macroreticular resins. Illustrative spherical rigid bead macroreticular Amberchrom® resins such as those sold under the designations CG-161, CG-300, CG-100 for styrene/divinyl benzene-containing materials, and CG-71 for a methacrylate/dimethacrylate-containing material are also useful. These latter resin particles are commercially available from Toso-Haas, Montgomeryville, Pa. Each of the latter four resins is available in three particle size ranges: "s" or superfine at 20–50 μm, "m" or medium at 50–100 μm, and "c" or coarse at 80–160 μm. Typical resin particles are reported to have the following average pore sizes and surface areas: CG-161 150 Å and 900 $m^2$/g; CG-300 300 Å and 700 $m^2$/g; CG-1000 1000 Å and 200 $m^2$/g; and CG-71 250 Å and 500 m2/g. It is understood that the Amberlite® XAD-7 and Amberchrom® CG-71 are chemically similar materials, as are Amberlite® XAD-4 and Amberchrom® CG-161.

A contemplated polymeric resin support is typically sufficiently hydrophilic and wettable that when placed in distilled water and shaken, the resin sinks rather than floats. A more quantitative determination of a satisfactory support can be found in the water regain values discussed in Parrish (1977) *Anal. Chem.*, 49(8):1189–1192 and Parrish (1965) *J. Appl. Chem.* (London), 15:280–288. Using water regain values, a contemplated resin exhibits a water regain value greater than about 0.75, and less than about 3.5. A preferred resin exhibits a water regain value of about 1 to about 2.5, and more preferably about 1.75 to about 2.25.

A contemplated support has sufficient porosity that it can adsorb diglycolamide extractant loaded (coated) in an amount of about 3 to about 50 weight percent of the total separation medium weight and still remain free-flowing when dry. The diglycolamide extractant is more preferably present at about 10 to about 40 weight percent of the separation medium, and more preferably still at about 20 to about 40 weight percent in the absence of diluent. When diluent is present, the diglycolamide portion can be about 3 to about 30 weight percent of the separation medium.

A contemplated support is also preferably particulate. By "dry", it is meant that the separation medium loses less than about 5 weight percent after being held at a temperature of 50° C. at a pressure of 0.1 mm of mercury for 24 hours.

More specifically, a preferred solid phase separation medium is comprised of free-flowing particles that contain about 40 weight percent N,N,N',N'-tetra-n-octyl diglycolamide (TO-DGA) extractant coated on Amberchrom -CG71, and is referred to as Yttrium Resin. The Yttrium Resin is now commercially available from Eichrom Technologies, Inc.

The diglycolamide extractant can be present in a contemplated extraction medium alone or it can be dissolved in an organic diluent. When a diluent is present, the extraction medium particles may adhere to each other (cohere), rather than being free flowing as are particles of dry sand, which is preferred. A contemplated separation medium is preferably free of an organic diluent, and preferably free of a diluent that is (i) insoluble or has limited (sparing) solubility in water and (ii) capable of dissolving a substantial quantity of water.

The amount of diglycolamide extractant in the diluent can vary depending upon the particular diglycolamide utilized. For example a concentration of about 0.1 to about 0.5 M of the tetraoctyl form in the diluent is satisfactory, with about 0.2 M being preferred. Concentrations above about 0.5 M of the diglycolamide in the diluent tend not improve multivalent metal ion recovery. Other diglycolamide derivatives can be present at about 0.1 to about 1.5 molar in the diluent.

The diluent is an organic compound that has a relatively high boiling point; that is, about 170 degrees to about 220 degrees C at atmospheric pressure, limited or no solubility in water; that is, about 0.5 weight percent or less, and in which the diglycolamide is soluble. Some of the diluents contemplated can dissolve about 0.5 to about 6.0 M of water.

Particularly preferred diluents are hydrocarbons such as decane, dodecane, decalin, diethylbenzene and diisopropylbenzene. Other illustrative diluents include alcohols, ketones, carboxylic acids, esters and nitroaromatics such as nitrobenzene. Suitable alcohols include 1-octanol, 1-heptanol and 1-decanol. The carboxylic acids include octanoic acid, heptanoic and hexanoic acids. Ketones that meet the criteria can be either 2-hexanone or 4-methyl-2-pentanone, whereas the esters include butyl acetate and amyl acetate.

The extractant such as N,N,N',N'-tetra-n-octyl diglycolamide (TO-DGA) and similar tetraalkyl diamides dissolved in a water-insoluble organic solvent such as nitrobenzene, chloroform, toluene or an alkane such as n-hexane or n-dodecane reported to be useful for the liquid/liquid extraction of lanthanide and actinide cations from aqueous nitric and perchloric acid solutions are known. [Sasaki et al. (2001) *Solvent Extr. Ion Exch.*, 19(1):91–103; and Sasaki et al. (2002) *Solvent Extr. Ion Exch.*, 20(1):21–34. See, also the web site of the Japanese Atomic Energy Research Institute (JAERI) and Japanese Kokai No. 2002-1007 and No. 2002-243890.] In those studies, the synthesis of N,N,N',N'-tetra-(2-ehtylhexyl) diglycolamide not reported nor was the cation partitioning behavior of this extractant ever reported by these authors. That is a new compound.

The extractant such as N,N,N',N'-tetra-n-octyl diglycolamide (TO-DGA) can be mixed with a lower boiling organic solvent such as methanol, ethanol, acetone, diethyl ether, methyl ethyl ketone, hexanes, or toluene and coated onto an inert support, such as glass (silica) beads, polypropylene beads, polyester beads, or silica gel.

A method for separating a preselected multivalent lanthanide or actinide cation from an aqueous sample containing additional polyvalent metal cations is contemplated. That method includes the steps of contacting an above-described separation medium with an acidic aqueous sample containing dissolved multivalent cations, including the predetermined lanthanide or actinide cation. That contact is maintained for a time period sufficient for the multivalent lanthanide or actinide cations to be extracted from the sample solution to the separation medium to form a solid phase loaded separation medium and a liquid phase multivalent lanthanide or actinide cation-depleted sample. The solid and liquid phases are thereafter separated. The lanthanide or actinide cation is thereafter preferably eluted from the loaded separation medium by contacting the loaded separation medium with water or dilute hydrochloric acid. The contact is typically carried out at an acidity near the maximum for the cation(s) to be separated (extracted), such as at an acid concentration near that at which the separation medium reaches maximal extraction.

Extraction of the lanthanide or actinide cations from the solution to the separation medium to form a solid phase loaded separation medium is typically a rapid event. Thus, gravity feed of a lanthanide or actinide cation-containing aqueous sample solution through a typically dimensioned chromatographic column containing the separation medium with little retardation of the flow rate typically provides a sufficient contact maintenance time. Swirling of the sample solution and separation medium for a few minutes in a flask or beaker is also typically sufficient contacting.

Separation of the solid and liquid phases is also readily achieved. Where a column or cartridge is used as the separation apparatus, passage of the liquid phase lanthanide or actinide cation-depleted sample out of the vessel is sufficient to effect the desired solid/liquid phase separation. Where a beaker, flask or other vessel is used for the separation, simple decantation can be used to effect the separation of phases. One can also use aqueous lithium nitrate, lithium chloride or aluminum nitrate in a wash or rinsing step to assist in eluting interfering cations that may be maintained in the load solution present in the interstices between particles.

In preferred practice, the desired lanthanide or actinide cations are selectively eluted from the loaded separation medium by contacting the loaded separation medium with an aqueous solution having a pH value of about 1 or less, or with plain distilled or deionized or even tap water. The elution solution need not be distilled or deionized water, although such water is preferred. Typically, aqueous 0.1 M HCl is utilized to elute lanthanide or actinide cations from the separation medium. The concentration of nitrate anions is also preferably less than or equal to about 0.1 molar.

The contacting of the separation medium with the aqueous acidic lanthanide or actinide cation-containing sample can be carried out in an open or closed vessel in which the solid and liquid are swirled or stirred together. It is more preferred, however, that that contacting step be carried out in a below-described support vessel such as a chromatographic separation column or cartridge by passing the aqueous acidic sample solution through the vessel, and that the preferred elution of lanthanide or actinide cations be carried out by passing water or dilute hydrochloric acid (at a concentration of about 0.1 M or less) through the loaded separation medium in the support vessel.

An apparatus for separating lanthanide or actinide cations such as yttrium or actinium cations from an acidic aqueous solution comprising the above separation medium in a support vessel is also contemplated. A contemplated support vessel is typically glass or plastic such as polyethylene or polypropylene and is typically a chromatographic column or cartridge. A contemplated vessel can include one or more inlets, outlets, valves such as stopcocks and similar appendages.

One contemplated support vessel is cylindrical and has an inlet for receiving an aqueous sample solution prior to contact of the sample solution with the contained separation medium and an outlet for the egress of water or other liquid after contact with the medium. When the support vessel is a glass or plastic chromatographic column or cartridge, the vessel can contain appropriate valves such as stopcocks for controlling aqueous flow, as are well-known, as well as connection joints such as Luer fittings. The inlet for receiving an aqueous liquid sample solution and outlet for liquid egress can be the same structure as where a beaker, flask or other vessel is used for a contemplated separation process, but the inlet and outlet are typically different and are separated from each other. Usually, the inlet and outlet are at opposite ends of the apparatus.

FIG. 1 provides a schematic drawing of one preferred separation apparatus. Here, the separation apparatus 10 is shown to include a support vessel as a column 12 having an inlet 26 and an outlet 28 for liquid such as water. The outlet has an integral seal and is separable from the seal at a frangible connection 32. The separation apparatus 10 contains one or more flow-permitting support elements. In one embodiment, a frit 22 supports separation medium 16, and an upper frit 18 helps to keep the separation medium in place during the introduction of an influent of aqueous sample or eluting solution. Contemplated frits can be made of glass or plastic such as high-density polyethylene (HDPE). A HDPE frit of 35–45 μm average pore size is preferred. A contemplated apparatus can also include a stopcock or other flow-regulating device (not shown) at, near or in conjunction with the outlet 28 to assist in regulating flow through the apparatus.

An above-described chromatographic column is typically offered for sale with a cap (not shown) placed into inlet 26 and snap-off (frangible) tube end 30. The separation medium in such a column is typically wet and equilibrated with about 0.05 to about 0.5 N $HNO_3$. It is preferred that the average diameter of separation medium particles be about 100 to about 150 μm when a chromatographic column separation apparatus is prepared and used.

Figure 2:
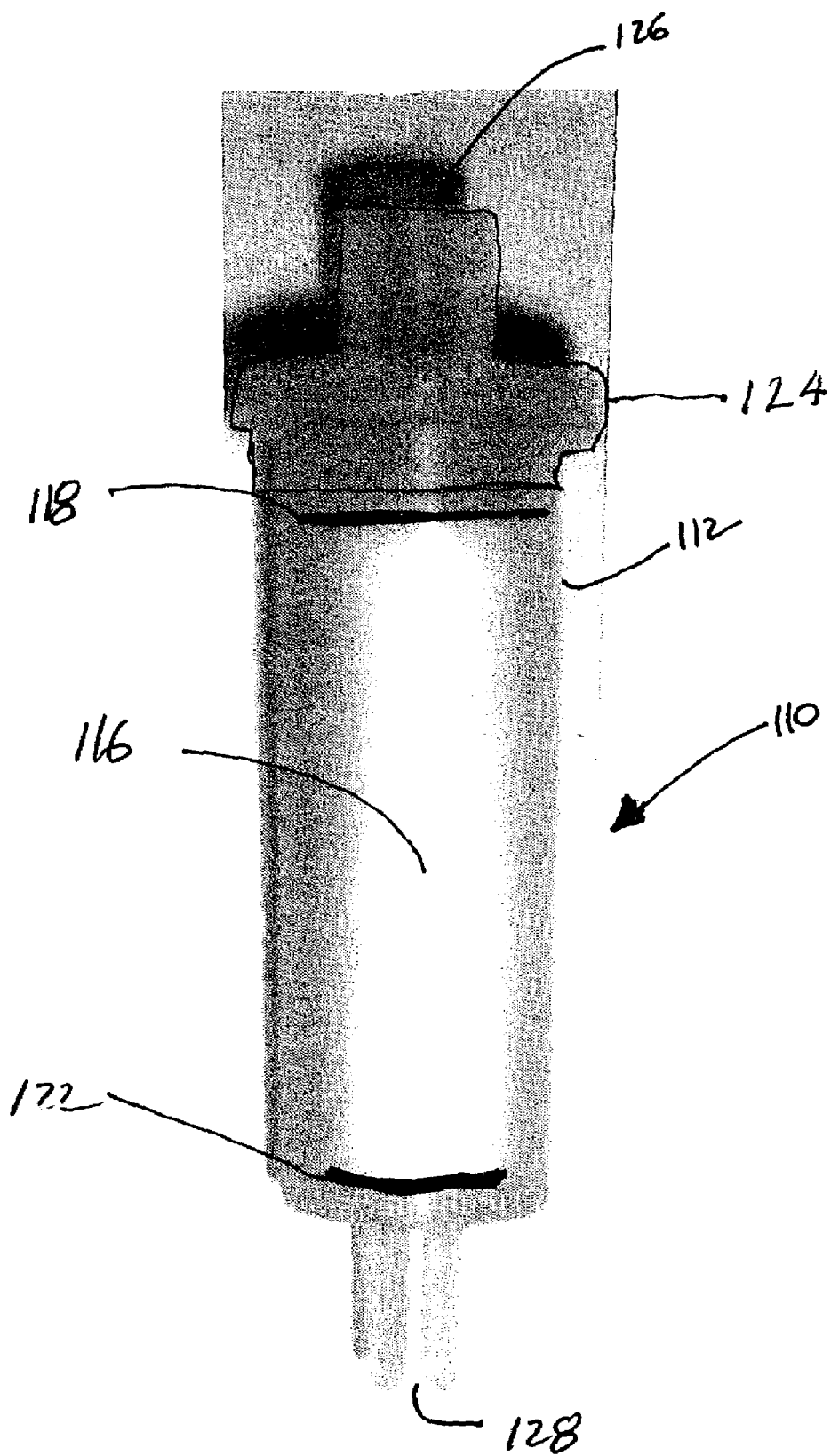
FIG. 2 shows schematic representation of another separation vessel useful in an embodiment of the invention.

FIG. 2 provides a second schematic drawing of another preferred separation apparatus. Here, the separation apparatus 110 is shown to include a support vessel as a cartridge 112 having an inlet 126 and an outlet 128 for liquid such as water. A cap 124 is preferably integrally molded with the inlet 126. The outlet 128 is preferably integrally molded with the cartridge 112. The separation apparatus 110 contains a porous support such as a frit 122 that supports separation medium 116. An upper porous support such as a frit 118 helps to keep the separation medium in place during the introduction of an influent aqueous sample or eluting solution. A contemplated apparatus can also include a stopcock or other flow-regulating device (not shown) at, near or in conjunction with the outlet 128 to assist in regulating flow through the apparatus.

A contemplated cartridge such as a separation vessel of FIG. 2 is typically provided with the separation medium in a dry state, or at least not wet with aqueous nitric acid. In addition, inlet 126 and outlet 128 are preferably standard fittings such as Luer fittings that are adapted for easy connection to other standard gas and/or liquid connections. It is also preferred that the average diameter of separation particles be about 50 to about 100 μm when a cartridge separation apparatus is prepared and used.

One contemplated separation apparatus such as that of FIG. 1 can be readily prepared by slurrying the separation medium in water or acidified water such as 0.5 normal nitric acid. The slurry is added onto a flow-permitting support element such as a frit in a vertically oriented support vessel such as a column. The separation medium is permitted to settle under the force of gravity and can be packed more densely using vibration, tapping or the like. Once a desired height of separation medium is achieved, any excess liquid is removed as by vacuum, a second flow-permitting element such as another frit is inserted into the column above the separation medium and the cap is added.

To prepare another chromatographic column that can be used for a contemplated separation, a portion of separation medium prepared as discussed above is slurried in 0.5 M nitric acid and aliquots of that slurry are transferred under nitrogen pressure to a 10 cm long glass Bio-Rad® column (1.4 mm inside diameter) equipped with polypropylene fittings manufactured under the trademark "Cheminert" by Chromatronix, Inc., Berkeley, Calif. When the desired bed height is reached (corresponding to a bed volume of about 0.6 cm$^3$), the separation medium is resettled by backwashing. The separation medium is then rinsed with several bed volumes of 0.5 M nitric acid.

Chromatographic columns can similarly be prepared in other vessels such as 23 cm long glass Pasteur pipettes having a small glass wool plug (porous support) in the bottom and a layer of 80/100 mesh glass beads on top of the separation medium to prevent disruption of the bed by sample introduction. Because these pipettes lack a liquid-holding reservoir, sample solutions are introduced using a small polyethylene funnel attached to the top of the pipette via a short length of vinyl tubing. See, Dietz et al. (1996) *J. Chem. Ed.*, 73(2):182–184.

A separation vessel shown in FIG. 2 can be prepared by adding a predetermined weight of dry separation medium to the cartridge 112 containing molded outlet 128 and support frit 122. The thus filled cartridge is vibrated in a vertical orientation to achieve a constant height for the separation medium bed, the upper porous support 118 is inserted, and the cap 124 containing molded fluid inlet 126 is placed onto the device.

Partition ratios for multivalent cations are measured radiometrically using conventional procedures, and all measurements are performed at 23 ±2° C. Gamma and beta counting are performed on a Packard® Cobra Gamma Counter and a Packard® Model 2200 Liquid Scintillation Counter, respectively. Assessment of non-radioactive elements is performed using well-known inductively-coupled plasma atomic emission spectroscopy.

The DF value for a given step is multiplied with the DF value for the next step or, when represented using exponents, the DF value exponents are added for each step. A DF value of about $10^{10}$ is about the largest DF that can be readily determined using typical radioanalytical laboratory apparatus.

The decontamination factor (DF) is defined using the following equation:

$$DF = \left( \frac{\frac{[\text{Analyte}]_{effluent}}{[\text{Impurity}]_{effluent}}}{\frac{[\text{Analyte}]_{influent}}{[\text{Impurity}]_{influent}}} \right)$$

For a system at radioactive steady state (e.g., $^{229}$Th and its daughters including $^{225}$Ac, $^{225}$Ra and $^{213}$Bi), the denominator is about 1. This means a DF value can be approximated by examining the stripping peak in a chromatogram and dividing the maximum cpm/mL for the analyte (i.e., the desired $^{225}$Ac and $^{225}$Ra daughter radionuclides) by the activity of the impurities (i.e., $^{229}$Th parent).

Alternatively, the DF value can be calculated by taking the ratio of the dry weight distribution ratios ($D_w$) for an analyte and impurity. The dry weight distribution ratio is defined as:

$$D_w = \left( \frac{A_o - A_f}{A_f} \right) \left( \frac{V}{m_R \cdot (\% \text{ solids}/100)} \right)$$

where $A_o$=the count rate in solution prior to contact with the resin, $A_f$=the count rate in solution after contact with resin, V=volume (mL) of solution in contact with resin, $m_R$=mass (g) of wet resin, and the % solids permits conversion to the dry mass of resin. The sorption of various radioisotopes from nitric acid solution by a separation medium is initially measured by contacting a known volume (typically 1.0 mL) of a spiked acid solution of appropriate concentration with a known mass of medium. The ratio of the aqueous phase volume (mL) to the mass of the chromatographic materials (g) ranges from 70 to 180. (This ratio is determined primarily by the need to produce an easily measured decrease in the aqueous activity by contact with the medium.) Although equilibrium is generally reached in less than 20 minutes, a 1 hour mixing time is normally employed.

The $D_w$ values can be converted to the number of free column volumes to peak maximum (i.e., the resin capacity factor), k', by dividing by approximately 2.19. This factor includes the conversion of $D_w$ to D (a volume partition ratio) and the value of the ratio of the volume of stationary phase ($v_s$) to the volume of mobile phase ($v_m$), $v_s/v_m$, typically observed for chromatographic columns packed with the Strontium-selective resin (Eichrom Technologies, Inc.). (The term "stationary phase" refers to the volume of liquid extracting solution contained in the pores of the support.)

Assuming that the "influent" is at radioactive steady state (making the denominator for DF unity), the ratio of $D_w$ values for analyte/impurity are:

$$DF = \frac{\left(\frac{A_o - A_f}{A_f}\right)^{analyte} / \left(\frac{V}{m_R \cdot (\% \text{ solids}/100)}\right)}{\left(\frac{A_o - A_f}{A_f}\right)^{impurity} / \left(\frac{V}{m_R \cdot (\% \text{ solids}/100)}\right)}$$

which simplifies after cancellation to:

$$DF = \frac{\left(\frac{A_o - A_f}{A_f}\right)^{analyte}}{\left(\frac{A_o - A_f}{A_f}\right)^{impurity}}$$

where $A_o$, $A_f$, V, $m_R$ and % solids are as previously defined. These ratios of activities are proportional to the molar concentrations cited elsewhere in the definition of DF.

EXAMPLE 1

Synthesis of N,N,N',N'-Tetra-n-octyl-diglycolamide (TO-DGA)

The synthesis of the TO-DGA is comparatively straightforward using commercially available reactants, requiring only 1–2 reaction steps, and easy purification by an extractive process. The overall synthesis and purification can be accomplished in less than six person-hours with about a 90% overall yield. An illustrative, not yet optimized synthesis procedure for the production of 60 grams of the TO-DGA is detailed below.

All chemicals were purchased from Aldrich Chemical Co., Milwaukee, Wis., and were used as received, except for the triethylamine that was freshly distilled from calcium hydride before use. All glassware was oven-dried prior to use and the reaction was carried out at ambient temperature. A positive pressure inert atmosphere of nitrogen was maintained with a latex balloon and the reaction mixture was stirred magnetically. Reactions on a larger scale require mechanical stirring because of the large amount of precipitate that formed.

A 500-mL single-neck round bottom flask was charged with dry tetrahydrofuran (THF) (120 mL) and diglycolyl chloride (15.0 mL, 126 mmol). The flask was partially immersed in a $H_2O$ bath to dissipate heat from the mild exotherm. A dropping funnel was charged with dioctylamine (57.4 g, 238 mmol) and triethylamine (37.2 mL, 265 mmol) in THF (60 mL).

The amine solution was added drop-wise to the magnetically stirred reaction mixture over a period of about 1.5 hours. A white precipitate of triethylammonium chloride immediately formed upon combining the solutions. After addition of the amine solution was complete, the dropping funnel was rinsed with an additional 10 mL THF, which was added to the reaction mixture. The mixture was stirred for an additional 1 hour, after which 10 mL $H_2O$ was added. The THF was subsequently removed by rotary evaporation.

To the pasty yellow residue was added 100 mL $H_2O$, creating a viscous orange upper phase and a colorless, cloudy lower phase. The phases were separated in a separatory funnel and the lower phase was extracted twice with 10 mL petroleum ether. The petroleum ether washes were added to the initial upper phase that was extracted with 15 mL $H_2O$, 2×15 mL 1 M HCl, 15 mL $H_2O$, and 20 mL 5% (w/v) $NaHCO_3$. Both resulting phases were cloudy orange.

After settling for about 18 hours, the two phases had not changed in appearance. The upper phase was extracted five times with 20 mL 5% $NaHCO_3$. The lower phases appeared to be emulsions after extraction and were discarded. The upper phase was extracted with 10 mL 1 M HCl, 2×10 mL $H_2O$, and 25 mL brine, dried over anhydrous $MgSO_4$, filtered gravitationally through fluted paper, and concentrated by rotary evaporation. Yield: 62.92 g (91%) orange oil.

Similar preparations were carried out using other amines, including bis(2-ethylhexyl)-amine, and a repeat synthesis was carried out using dioctylamine. The results of those syntheses and initial analytical data are provided below in Table 1.

TABLE 1

Analytical Data for Diglycolamides of the Formula RR'NC (O) $CH_2OCH_2$ C (O) NRR'

| R | R' | Appearance | Yield % | NMR or MS |
|---|---|---|---|---|
| Octyl | Octyl | Orange oil | 94 | $^1$H NMR: 4.307 (s, 4H); 3.291 (t, 4H, J=8 Hz); 3.177 (t, 4H, J=8 Hz); 1.519 (m, 8H); 1.272 (br, 40H); 0.885 (t, 6H, J=6 Hz); 0.876 (t, 6H, J=6 Hz) LC-MS: 3.6 min (2%, m/z 358.2, calcd for dioctyl diamide $C_{20}H_{40}N_2O_3 \cdot H^+$: 357.31); 4.06 min (1%, m/z 469.3, calcd for trioctyl diamide $C_{28}H_{56}N_2O_3 \cdot H^+$: 469.44); 4.53 min (96%, m/z 581.4, calcd for tetraoctyl diamide $C_{36}H_{72}N_2O_3 \cdot H^+$: 581.56) |
| 2-Ethyl-hexyl | 2-Ethyl-hexyl | Light yellow oil | 94 | $^1$H NMR: 4.330 (s, 4H); 3.37 (m, 4H); 3.043 (d, 4H, J=7 Hz); 1.669 (m, 3H); 1.560 (m, 3H); 1.25 (m, 30H); 0.88 (m, 24H) LC-MS: 4.47 min (91%, m/z 581.4, calcd for tetra-(2-ethylhexyl)diamide $C_{36}H_{72}N_2O_3 \cdot H^+$: 581.56), 5.50 min (9%, m/z 920.4). |
| Hexyl | Methyl | Yellow oil | 84 | $^1$H NMR: 4.314 (s, 4H); 4.293 (s, 2H); 3.351 (t, 4H, J=8 Hz); 3.23 (t, 4H, J=8 Hz); 2.962 (s, 6H); 2.920 (s, 6H); 1.529 (m, 8H); 0.885 (m, 12H) ESI-MS: 329.6 calcd for $C_{18}H_{36}N_2O_3 \cdot H^+$: 329.28); 351.7 (calcd for $C_{18}H_{36}N_2O_3 \cdot Na^+$: 351.26); 680.0 (calcd for $2[C_{18}H_{36}N_2O_3] \cdot Na^+$: 679.97) |
| Decyl | Decyl | Waxy white solid | 72 | $^1$H NMR: 4.300 (s, 4H); 3.289 (t, 4H, J=7.7 Hz); 3.171 (t, 4H, J=7.7 Hz); 1.517 (m, 8H); 1.26 (br, 56H); 0.883 (t, 6H, J=7 Hz); 0.878 (t, 6H, J=7 Hz) LC-MS: 3.3 min (2%, m/z every 44 amu from 532.2 to 796.2); 4.6 min (2%, m/z 581.4); 5.4 min (95%, m/z 693.5, calcd for tetradecyl diamide $C_{44}H_{88}N_2O_3 \cdot H^+$: 693.69). |
| Octyl | H | White flakes | 93 | 6.28 (br, 2H); 4.041 (s, 4H); 3.311 (q, 4H, J=6.5 Hz); 1.54 (m, 4H); 1.3 (m. 20H), 0.883 (t, 6H, J=7 Hz) LC-MS: 3.5 min (98%, m/z 357.2, calcd for dioctyl |

TABLE 1-continued

Analytical Data for Diglycolamides of the
Formula RR'NC (O) CH$_2$OCH$_2$ C (O) NRR'

| R | R' | Appearance | Yield % | NMR or MS |
|---|---|---|---|---|
| | | | | diamide C$_{20}$H$_{40}$N$_2$O$_3$ · H$^+$: 357.31), 5.3 min (2%, m/z 693.5). |

NMR spectra were recorded in chloroform-d with tetramethylsilane internal reference using Varian Inova 400 MHz or 500 MHz spectrometers. MS was carried out using a PE Sciex API 150 EX Mass Spectrometer with ESI probe, positive ion detection. LC-MS was carried out using a Phenomenex LUNA-C18-2 column, 100×4.6 mm, 20% water/80% acetonitrile eluent. Peak detection was by mass spectrometry using atmospheric pressure chemical ionization (APCI) and an ion trap mass spectrometer, positive ion detection.

EXAMPLE 2

Preparation of Yttrium (TO-DGA) Resin

The separation medium used herein containing TO-DGA was prepared using a general procedure described previously for another separation medium [Horwitz et al., *Anal. Chem.* 1991, 63, 522–525]. A portion of TO-DGA (4.0 g) was dissolved in about 30 mL of CH$_3$OH and combined with 50–100 μm Amberchrom®-CG71 particles (6.0 g) in about 20 mL of CH$_3$OH. The mixture was rotated at about 50° C. on a rotary evaporator for about 30 minutes, after which the CH$_3$OH was vacuum distilled. After the bulk CH$_3$OH had been distilled, the free flowing resin was rotated under full vacuum at about 40–50° C. for another 30 minutes to remove residual CH$_3$OH. The resulting solid is referred to as Yttrium Resin and corresponds to 40% (w/w) loading of TO-DGA on 50–100 μm Amberchrom®-CG71 particles.

EXAMPLE 3

Extraction Studies with Yttrium Resin

The TO-DGA molecules behave as neutral extractants; that is, solute loading occurs at high acid (e.g., nitric (HNO$_3$) or hydrochloric (HCl) acids) or salt concentrations (e.g., lithium nitrate (LiNO$_3$), lithium chloride (LiCl) or aluminum nitrate [Al(NO$_3$)$_3$] and stripping is accomplished using dilute acid or salt solutions. One particularly noteworthy characteristic of the TO-DGA resin, shown below, is the high uptake of polyvalent cations from 0.1–5 molar HNO$_3$ and the efficient stripping of these same cations using dilute (about 0.5 M or less) HCl. The elution behavior of several tri-, tetra-, and hexavalent cations on the separation medium prepared (chromatographic material) using N,N,N',N'-tetra-n-octyl diglycolamide (TO-DGA) extractant described before are shown below in Table 2.

TABLE 2

Elution Behavior of Selected Cations on TO-DGA Resin*

| Fraction | Bed Volume | Percent of Total | | | |
| | | Al(III) | Y(III) | Th(IV) | U(VI) |
|---|---|---|---|---|---|
| Load(0.5 M HNO$_3$) | 2.0 | 66 | 0 | 0 | 0 |
| Rinse | 2.0 | 28 | 0 | 0 | 75 |
| (0.1 M HNO$_3$) | 2.0 | 0 | 0 | 0 | 8.4 |
| | 2.0 | 0 | 0 | 0 | 0 |
| | 2.0 | 0 | 0 | 0 | 0 |
| | 2.0 | 0 | 0 | 0 | 0 |
| Strip | 2.0 | 0 | 24 | 78 | 0 |
| (0.1 M HCl) | 2.0 | 0 | 76 | 16 | 0 |
| | 2.0 | 0 | 0 | 0 | 0 |
| | 2.0 | 0 | 0 | 0 | 0 |
| | 2.0 | 0 | 0 | 0 | 0 |

*Bed volume = 0.5 mL; Flow rate = 0.1 mL/minute for load, rinse, and strip

The negligible affinity of the TO-DGA resin for Al permits convenient purification of analytes from this frequently encountered matrix cation. The elution of U in 0.1 M HNO$_3$ while Th is retained is noteworthy, as this separation can be accomplished at significantly lower acid concentrations than employed using conventional anion exchange resins or quaternary alkylamine extraction chromatographic materials. The extraction behavior of the TO-DGA resin is useful in the separation and concentration of tri-, tetra-, and hexavalent cations and in the crossover from nitrate to chloride media (the medium of choice for medical applications).

Data relevant to the use of the TO-DGA resin separation media includes:
TO-DGA Formula Weight=580.98
Column Capacity:
  40% (w/w) TO-DGA on Amberchrom®-CG71
  Bed density=0.35 g/mL of bed
  0.40×0.35=0.140 g of TO-DGA/mL of bed or
  0.241 mmol of TO-DGA/mL of bed
Column capacity for Sr$^{2+}$ and Ra$^{2+}$
  Assume three TO-DGA per Sr$^{2+}$ or Ra$^{2+}$
  0.0803 mmol/mL of bed
Column capacity for Yb$^{3+}$:
  Assume 4 DGA per Yb$^{3+}$
  0.24/4=0.06 mmol of Yb$^{3+}$/mL of bed
  11 mg of Yb$^{3+}$/mL of bed

EXAMPLE 4

Uptake Results

Figure 3:
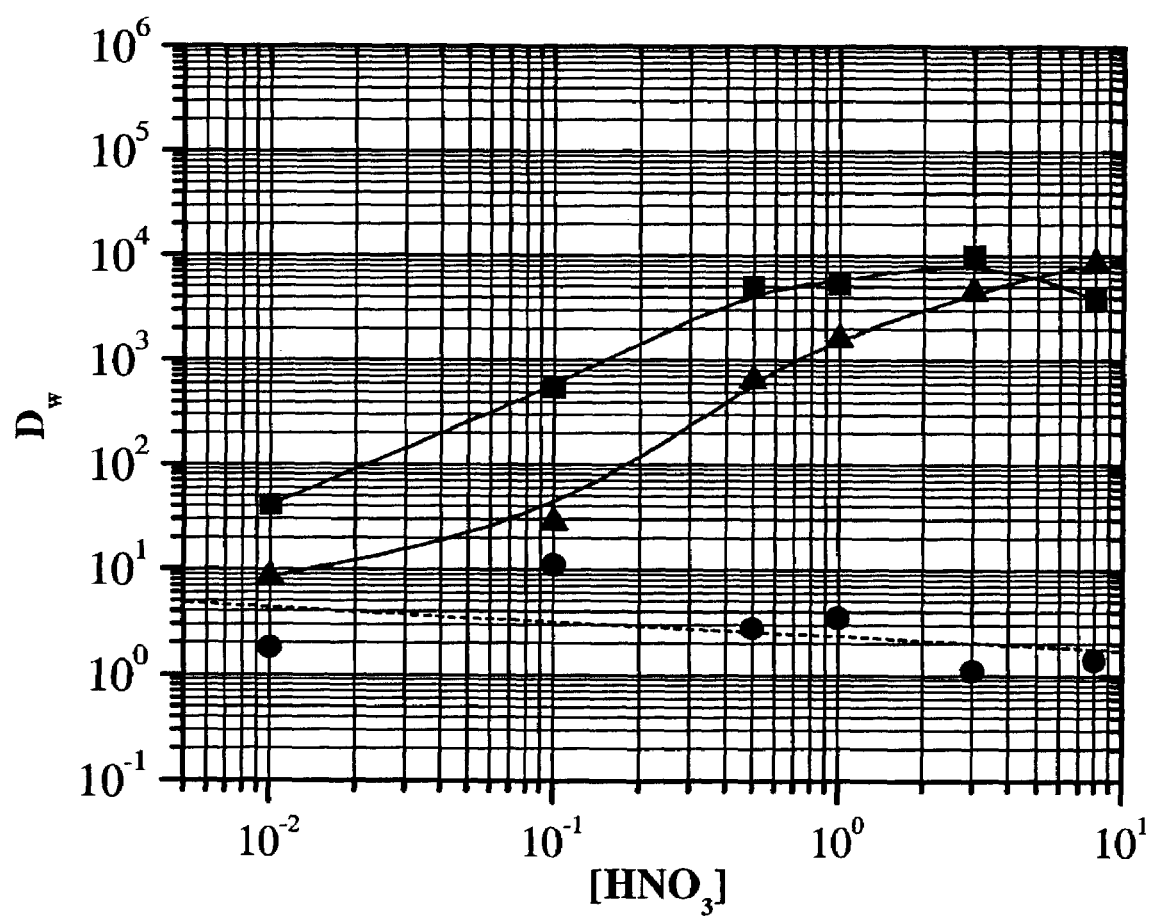
FIG. 3 is a plot of $D_w$ vs. [HNO$_3$] for uptake of Ba(II) (circles), Ce(III) (triangles), and Th(IV) (squares) by N,N,N',N'-tetra-n-octyl-DGA resin, using a contact time of 1 hour at 25° C.

Initial studies focused on the N,N,N',N'-tetra-n-octyl derivative of diglycolamide (DGA), and FIG. 3 shows the batch uptake results for Ba(II), Ce(III), and Th(IV) as a function of nitric acid concentration ([HNO$_3$]) on a separation medium containing 40% (w/w) N,N,N',N'-tetra-n-octyl-DGA on Amberchrom®-CG71 particles as an inert resin support. The partitioning of Ce(III) and Th(Iv) increase steadily up to about 3.0 M HNO$_3$, where the dry weight distribution ratio (D$_w$) for Ce(III)=4.5×10$^3$ and for Th(IV) D$_w$=1.0×10$^4$.

Figure 4:
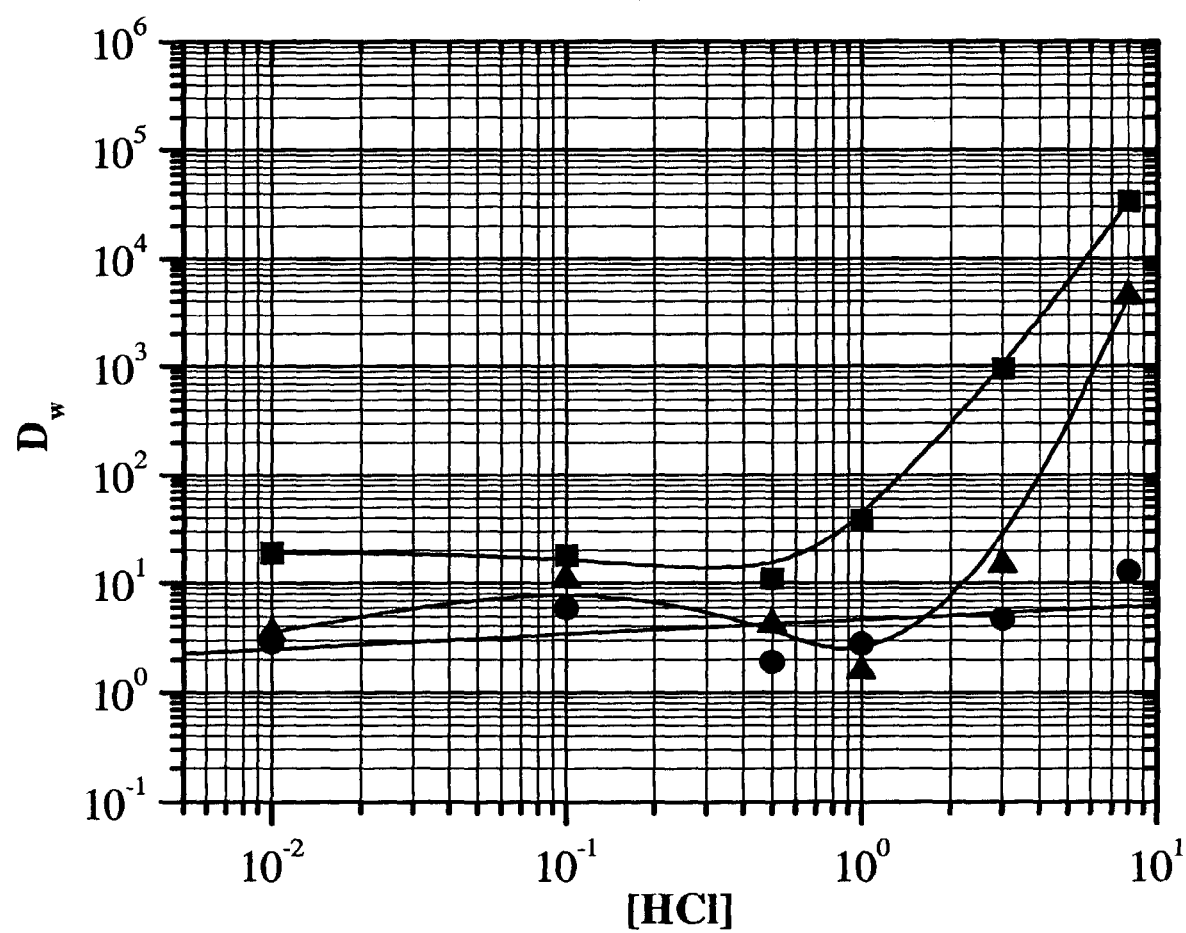
FIG. 4 is a plot of $D_w$ vs. [HCl] for uptake of Ba(II) (circles), Ce(III) (triangles), and Th(IV) (squares) by N,N,N',N'-tetra-n-octyl-DGA resin, using a contact time of 1 hour at 25° C.

Recovery of Ce(III) from the N,N,N',N'-tetra-n-octyl-DGA resin can be readily accomplished using dilute HCl, as shown in FIG. 4. The D$_w$ values for Ce(III) decrease to less than 10 by 2.0 M HCl, whereas the partitioning of Th(IV) plateaus in the D$_w$=10–20 range below approximately 0.50

M HCl. Barium(II) is not retained to any significant extent by N,N,N',N'-tetra-n-octyl-DGA in either $HNO_3$ or HCl solutions, as shown in FIGS. 3 and 4.

EXAMPLE 5

Steric Effects on Diglycolamide Uptake

Additional studies targeting an understanding of the influence of alkyl group size on trivalent cation selectivity exhibited by separation media containing 40% by weight of the N,N,N',N'-tetra-n-octyl, N,N'-di-n-hexyl-N,N'-dimethyl, or N,N,N',N'-tetra-(2-ethylhexyl) derivatives of DGA were undertaken.

The N,N'-di-n-hexyl-N,N'-dimethyl-DGA is expected to have diminished steric impact on the coordination and extraction mechanisms because of the shorter alkyl chains compared to N,N,N',N'-tetra-n-octyl-DGA. Such short alkyl groups may result in diminished utility as an extraction chromatographic material, however, as the decreased lipophilicity of the extractant is anticipated to give a separation medium that is less stable with respect to extractant leaching during column chromatographic operations.

The N,N,N',N'-tetra-(2-ethylhexyl)-substituted DGA permits a more detailed investigation of steric crowding as the four 2-ethylhexyl substituents are closer to the carbonyl oxygen donor sites that interact with the cation during the extraction process. The effects of the 2-ethylhexyl substituent on the selectivity of organophosphorus acid extractants is well-known, [Sekine et al. *Solvent Extraction Chemistry: Fundamentals and Applications*; Marcel Dekker: New York, 1977; and Rydberg et al. Eds. *Principles and Practices of Solvent Extraction*; Marcel Dekker: New York, 1992] and N,N,N',N'-tetra-(2-ethylhexyl)-DGA represents an interesting neutral extractant for the study of trivalent lanthanide separations as N,N,N',N'-tetra-n-octyl-DGA already has displayed considerable selectivity for heavy lanthanide cations over light lanthanide cations in various solvent extraction studies. [Sasaki et al. (2001) *Solvent Extr. Ion Exch.*, 19:91–103; and Sasaki et al. (2002) *Solvent Extr. Ion Exch.*, 20:21–34.]

Figure 5:
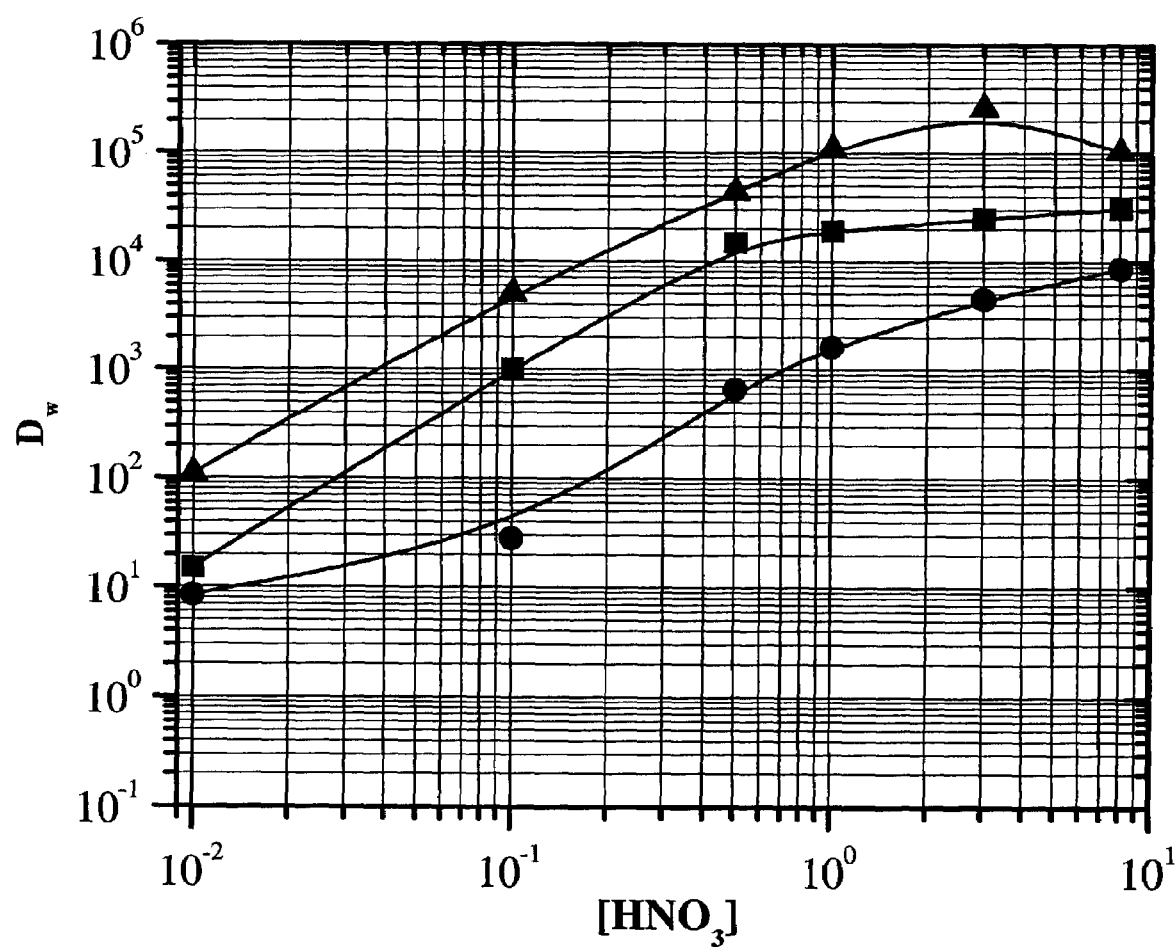
FIG. 5 is a plot of $D_w$ vs. [HNO$_3$] for uptake of Ce(III) (circles), Eu(III) (squares), and Y(III) (triangles) by N,N,N',N'-tetra-n-octyl-DGA resin, using a contact time of 1 hour at 25° C.

The partitioning of Ce(III), Eu(III), and Y(III) (the latter representative of a heavy lanthanide cation) by N,N,N',N'-tetra-n-octyl-DGA resin as a function of $[HNO_3]$ is shown in FIG. 5. The acid dependencies increase steadily from 0.010 M $HNO_3$ to approximately 3.0 M $HNO_3$, where some leveling is observed for the heavier lanthanide cations. The intralanthanide separation factors appear to maximize around 1.0 M $HNO_3$, with a separation factor for Y(III) from Ce(III) ($S^Y_{Ce}=(D_w$ for Y(III))/($D_w$ for Ce(III))) of 69 and $S^Y_{Eu}$ of 5.8.

Figure 6:
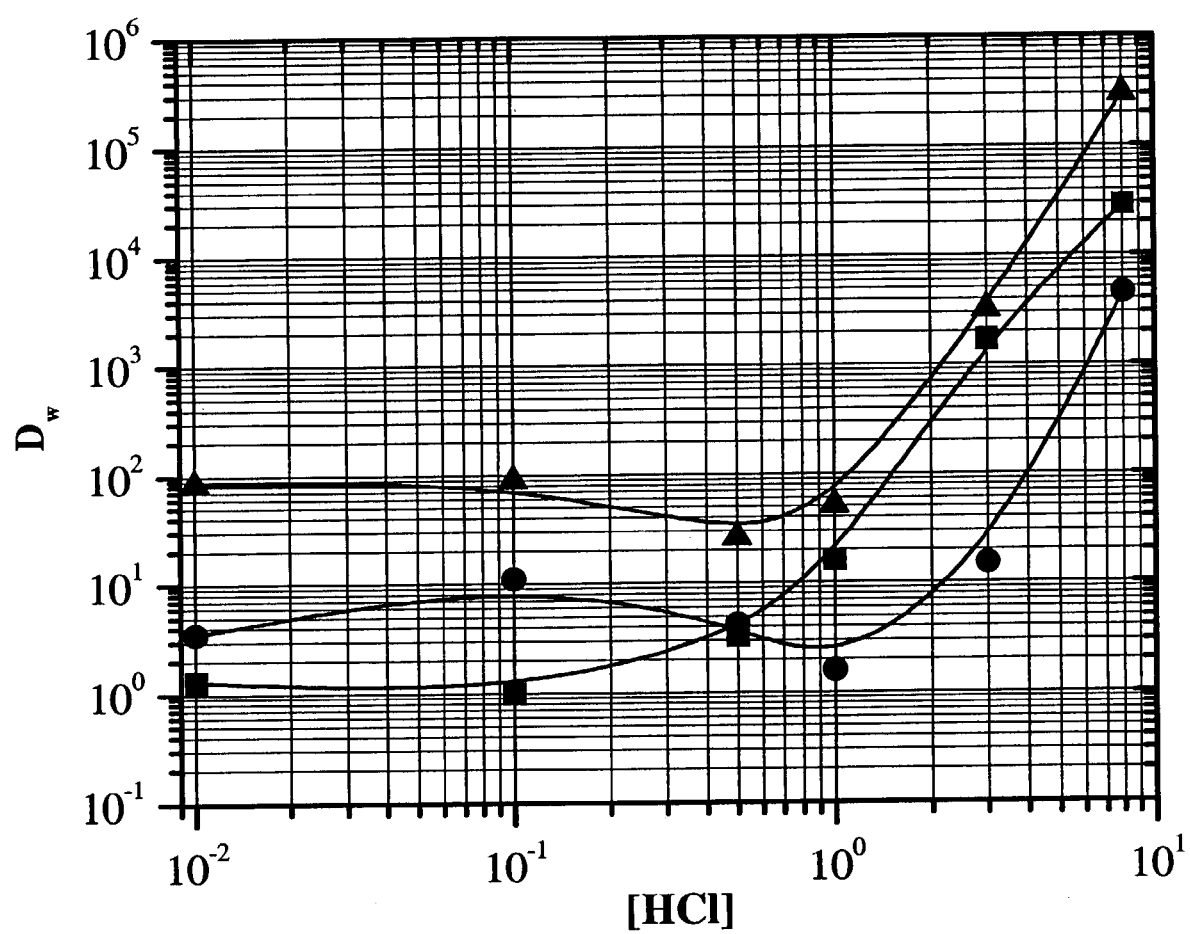
FIG. 6 is a plot of $D_w$ vs. [HCl] for uptake of Ce(III) (circles), Eu(III) (squares), and Y(III) (triangles) by N,N,N',N'-tetra-n-octyl-DGA resin, using a contact time of 1 hour at 25° C.

Because the partitioning of Eu(III) and Y(III) is considerable (i.e., $D_w$ is about $10^3$ or more) at the comparatively low concentration of 0.10 M $HNO_3$, stripping of these solutes from the N,N,N',N'-tetra-n-octyl-DGA resin is not practical using dilute $HNO_3$. FIG. 6 shows the dependence of $D_w$ vs. [HCl], and it is evident that Ce(III) and Eu(III) can be readily stripped using less than 1.0 M HCl, whereas Y(III) plateaus in the $D_w$=30–80 range below 1.0 M HCl. Related chromatographic experiments have shown that Y(III) is efficiently eluted using 0.10 M HCl.

Figure 7:
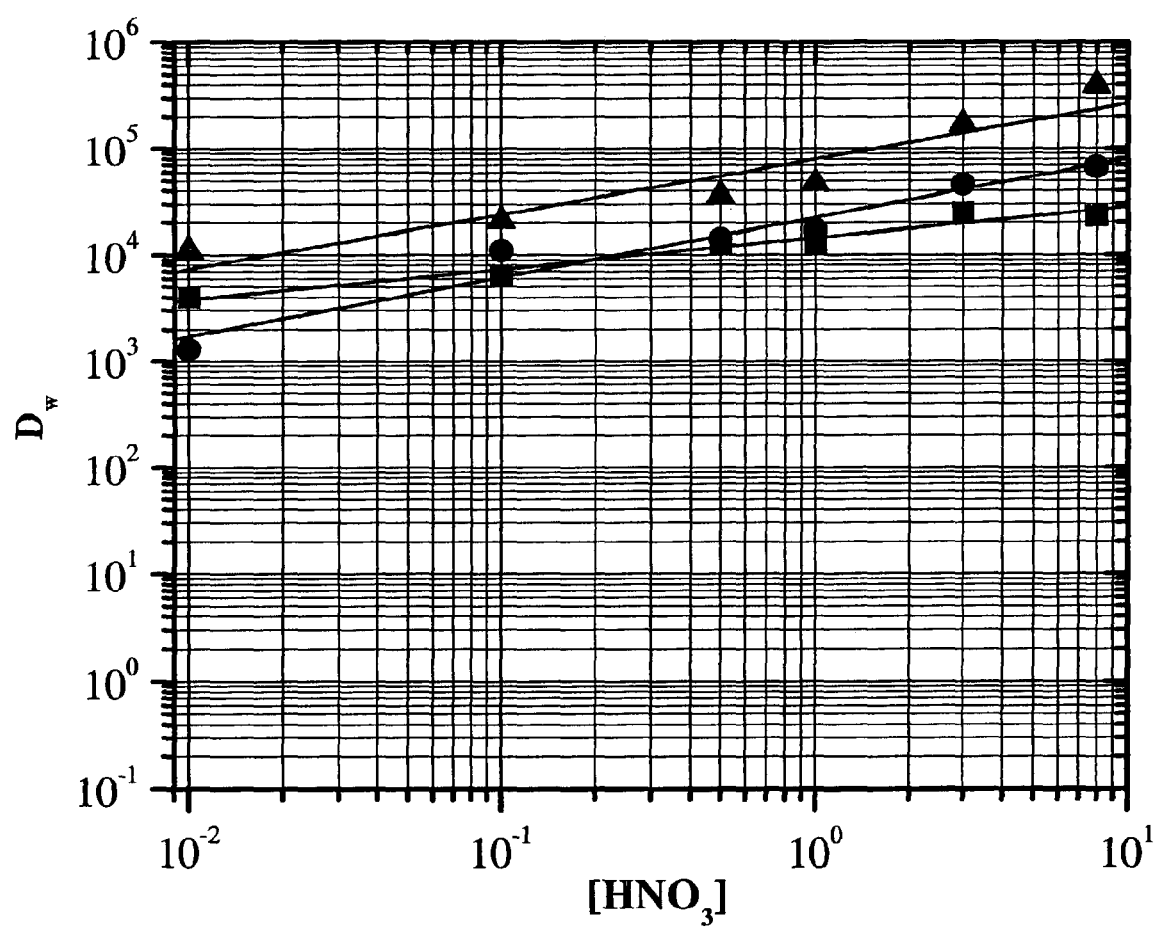
FIG. 7 is a plot of $D_w$ vs. [HNO$_3$] for uptake of Ce(III) (circles), Eu(III) (squares), and Y(III) (triangles) by N,N'-dihexyl-N,N'-dimethyl-DGA resin, using a contact time of 1 hour at 25° C.

FIG. 7 shows the partitioning of Ce(III), Eu(III), and Y(III) by N,N'-di-n-hexyl-N,N'-dimethyl-DGA resin as a function of $HNO_3$ concentration. The acid dependencies start at unusually high $D_w$ values of greater than $10^3$ and increase with an approximate unit slope, which is unusual as the extraction of trivalent cations by neutral extractants typically afford slopes of approximately three to meet electroneutrality requirements.

Figure 8:
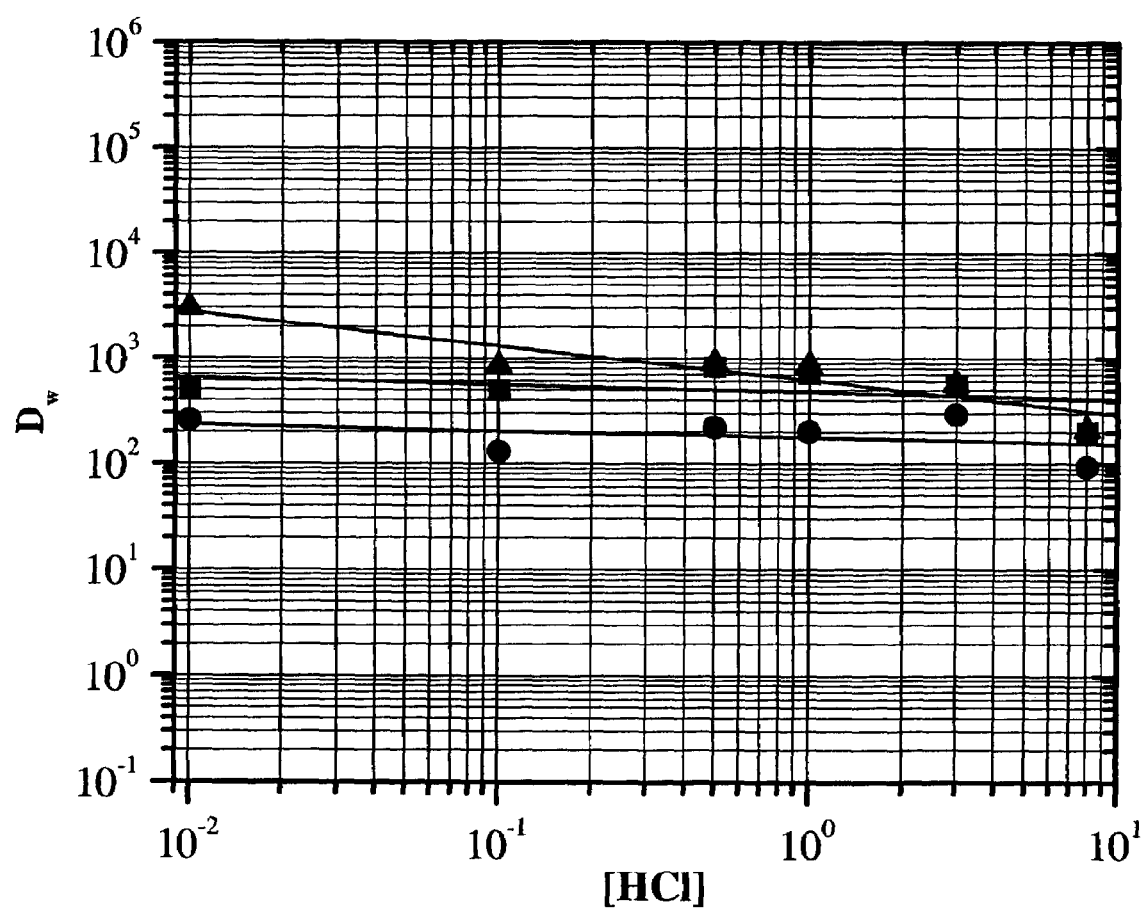
FIG. 8 is a plot of $D_w$ vs. [HCl] for uptake of Ce(III) (circles), Eu(III) (squares), and Y(III) (triangles) by N,N'-dihexyl-N,N'-dimethyl-DGA resin, using a contact time of 1 hour at 25° C.

The absence of a clear dependence on $[HNO_3]$ indicates that stripping the loaded solutes from N,N'-di-n-hexyl-N,N'-dimethyl-DGA resin with $HNO_3$ is not practical in a commercial setting, and the prospects of stripping with HCl are equally poor in view of the data in FIG. 8. Shown here as a function of [HCl] are the $D_w$ values for Ce(III), Eu(III), and Y(III), which do not decrease appreciably (about 200–3000) over the 0.010–8.0 M HCl range to afford any useful elution conditions.

Further, any selectivity between the lanthanide analytes has disappeared and the comparatively flat acid dependencies raise questions about the mechanism of extraction. Such properties also point to a unique utility of this separation medium to extract these cations as a single use separation medium that can extract selected cations and be discarded or otherwise treated as a concentrated waste because the solutes cannot be conveniently stripped by adjusting either the $HNO_3$ or HCl acid concentration. Thus, a mixture of trivalent and lower valent materials can be contacted with the separation medium resin and the trivalent cations trapped on the resin.

The N,N,N',N'-tetra-(2-ethylhexyl)-DGA molecule introduces alkyl group branching and comparatively more steric hindrance near the site of cation coordination. The data of FIG. 9 show the dependence of $D_w$ for Ce(III), Eu(III), and Y(III) vs. $[HNO_3]$ for N,N,N',N'-tetra-(2-ethylhexyl)-DGA resin, in which a greater acid dependence of $D_w$ is observed than for the N,N,N',N'-tetra-n-octyl derivative (FIG. 5).

For example, N,N,N',N'-tetra-n-octyl-DGA exhibits a $D_w=5.0\times10^3$ at 0.10 M $HNO_3$ and $D_w=2.4\times10^5$ at 3.0 M $HNO_3$ for Y(III), whereas N,N,N',N'-tetra(2-ethylhexyl)-DGA resin affords $D_w=8.4$ in 0.10 M $HNO_3$ and $D_w=9.3\times10^4$ at 3.0 M $HNO_3$. Above 0.10 M $HNO_3$, the partitioning of these trivalent cations by N,N,N',N'-tetra-(2-ethylhexyl)-DGA resin exhibits an acid dependence of approximately three, which is consistent with the extraction of trivalent cations by neutral extractants. This behavior contrasts with that observed in FIG. 5 for N,N,N',N'-tetra-n-octyl-DGA resin, in which the slope over the 0.1–2 M range of $HNO_3$ is approximately two. Also noteworthy is the plateau in $D_w$ exhibited by the N,N,N',N'-tetra-n-octyl derivative above approximately 2 M $HNO_3$, whereas partitioning by N,N,N',N'-tetra-(2-ethylhexyl)-DGA increases steadily to the highest $HNO_3$ concentration of 8.0 M used in these studies.

Figure 9:
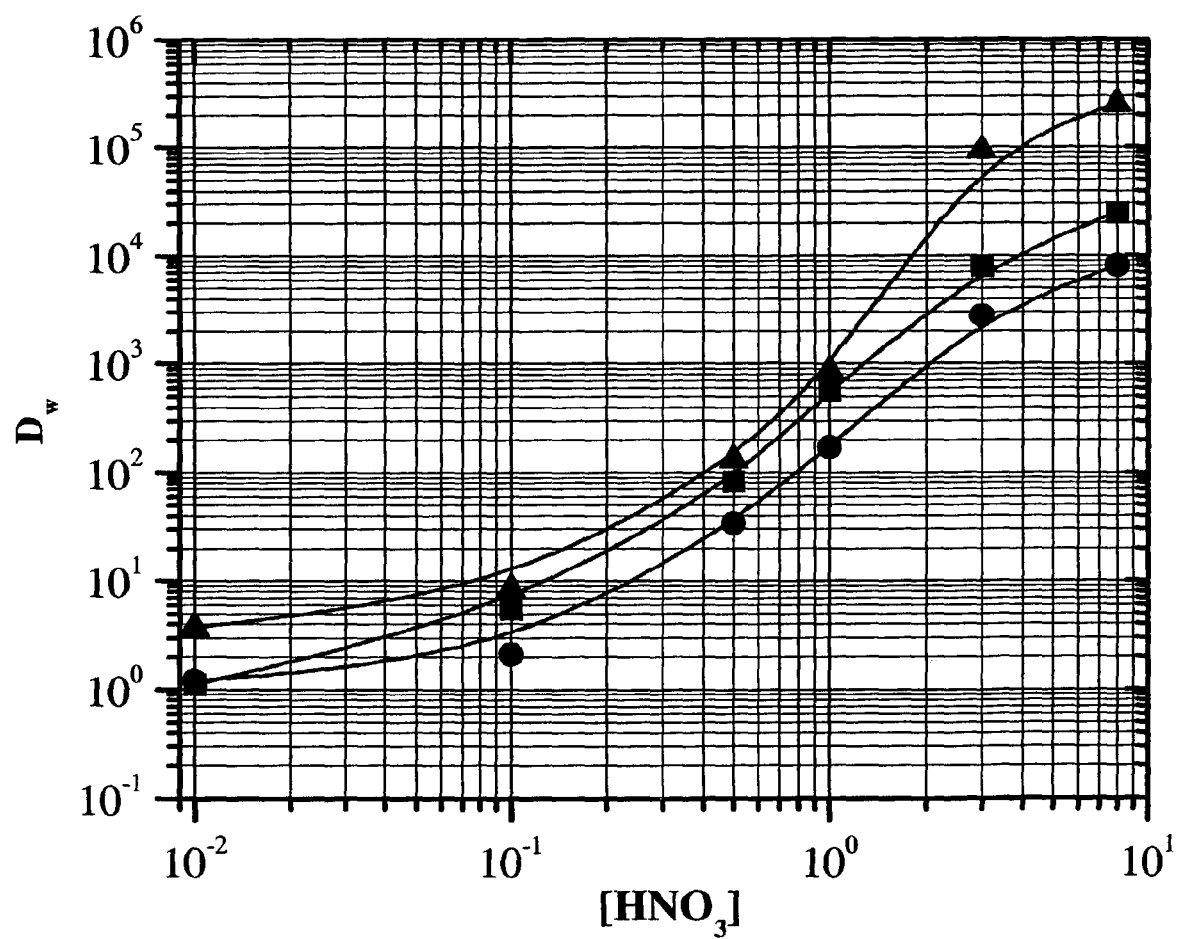
FIG. 9 is a plot of $D_w$ vs. [HNO$_3$] for uptake of Ce(III) (circles), Eu(III) (squares), and Y(III) (triangles) by N,N,N',N'-tetra- (2-ethylhexyl)-DGA resin, using a contact time of 1 hour at 25° C.

The acid dependence for N,N,N',N'-tetra-(2-ethylhexyl)-DGA shown in FIG. 9 illustrates the feasibility of stripping loaded solutes using dilute $HNO_3$. This behavior is substantially different from that exhibited by the N,N,N',N'-tetra-n-octyl-DGA derivative (FIG. 5) in which retention of some cations in dilute $HNO_3$ is still significant. These results expand the utility of the DGA resins to those processes than cannot tolerate HCl as a stripping agent.

The overall $S^Y_{Ce}$ in 3.0 M $HNO_3$ is somewhat larger at 58 for N,N,N',N'-tetra-n-octyl-DGA resin than for N,N,N',N'-tetra-(2-ethylhexyl)-DGA resin with $S^Y_{Ce}$=33. Interestingly, the $S^Y_{Eu}$ values from 3.0 M $HNO_3$ are nearly equivalent at 10 and 12 for the N,N,N',N'-tetra-n-octyl-DGA and N,N,N',N'-tetra-(2-ethylhexyl)-DGA resins, respectively.

Figure 10:
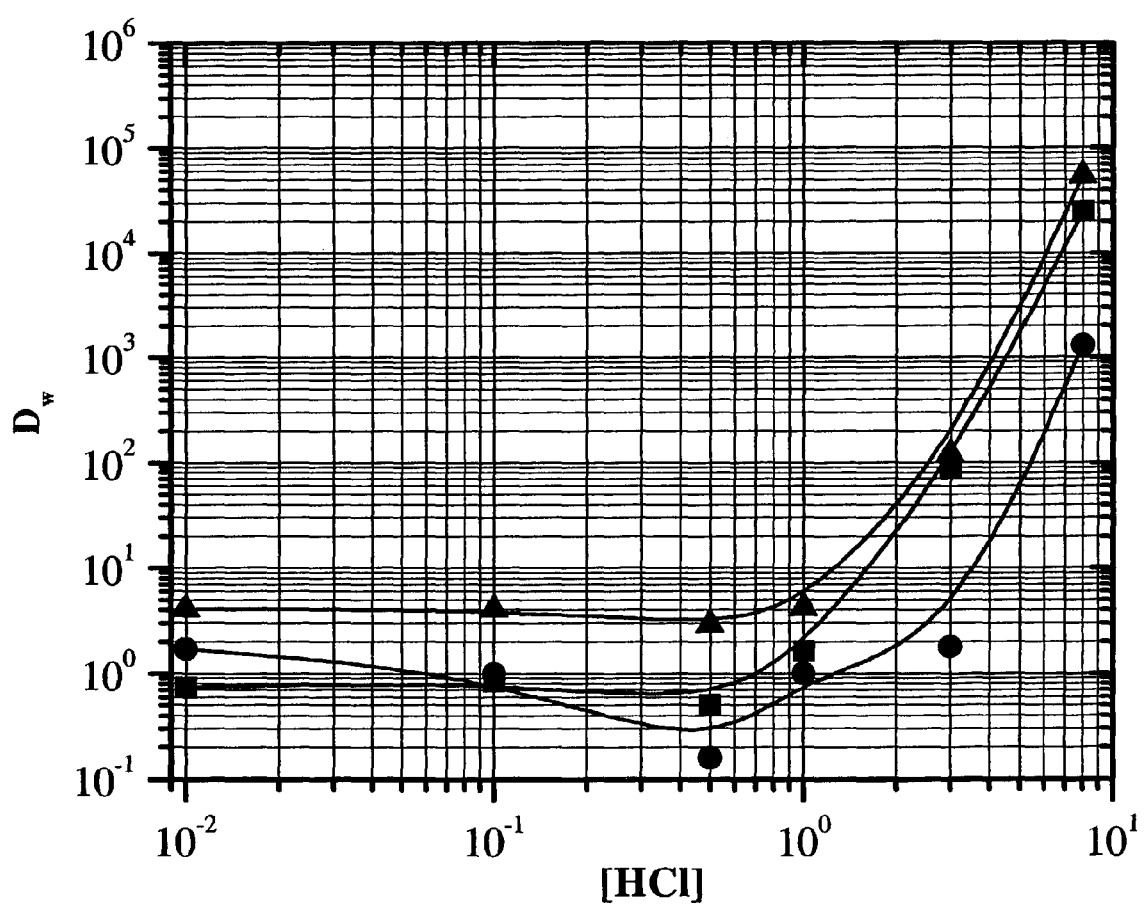
FIG. 10 is a plot of $D_w$ vs. [HCl] for uptake of Ce(III) (circles), Eu(III) (squares), and Y(III) (triangles) by N,N,N',N'-tetra- (2-ethylhexyl)-DGA resin, using a contact time of 1 hour at 25° C.

FIG. 10 shows the HCl acid dependence for the same three cations using N,N,N',N'-tetra-(2-ethylhexyl)-DGA resin, and these results are similar to those obtained for its straight chain n-octyl analog (FIG. 6). The $D_w$ values for these cations with the N,N,N',N'-tetra-n-octyl-DGA and N,N,N',N'-tetra-(2-ethylhexyl)-DGA resins decrease to less than approximately 20 at 0.10 M HCl, which illustrates the utility of these separation media for loading in concentrated HNO$_3$ (or HCl) and stripping into dilute HCl solutions.

Although there are significant differences in the extraction properties of separation media containing the N,N,N',N'-tetra-n-octyl-DGA and N,N,N',N'-tetra-(2-ethylhexyl)-DGA molecules, such behavior cannot be unequivocally attributed to steric effects based on the current data. In addition to steric considerations, different HNO$_3$ extraction behavior, self-aggregation characteristics, and any combination of these variables can contribute to the unique behavior exhibited by the n-octyl and 2-ethylhexyl derivatives of DGA.

EXAMPLE 6

Separation of Ac(III) and Ra(II)

Figure 11:
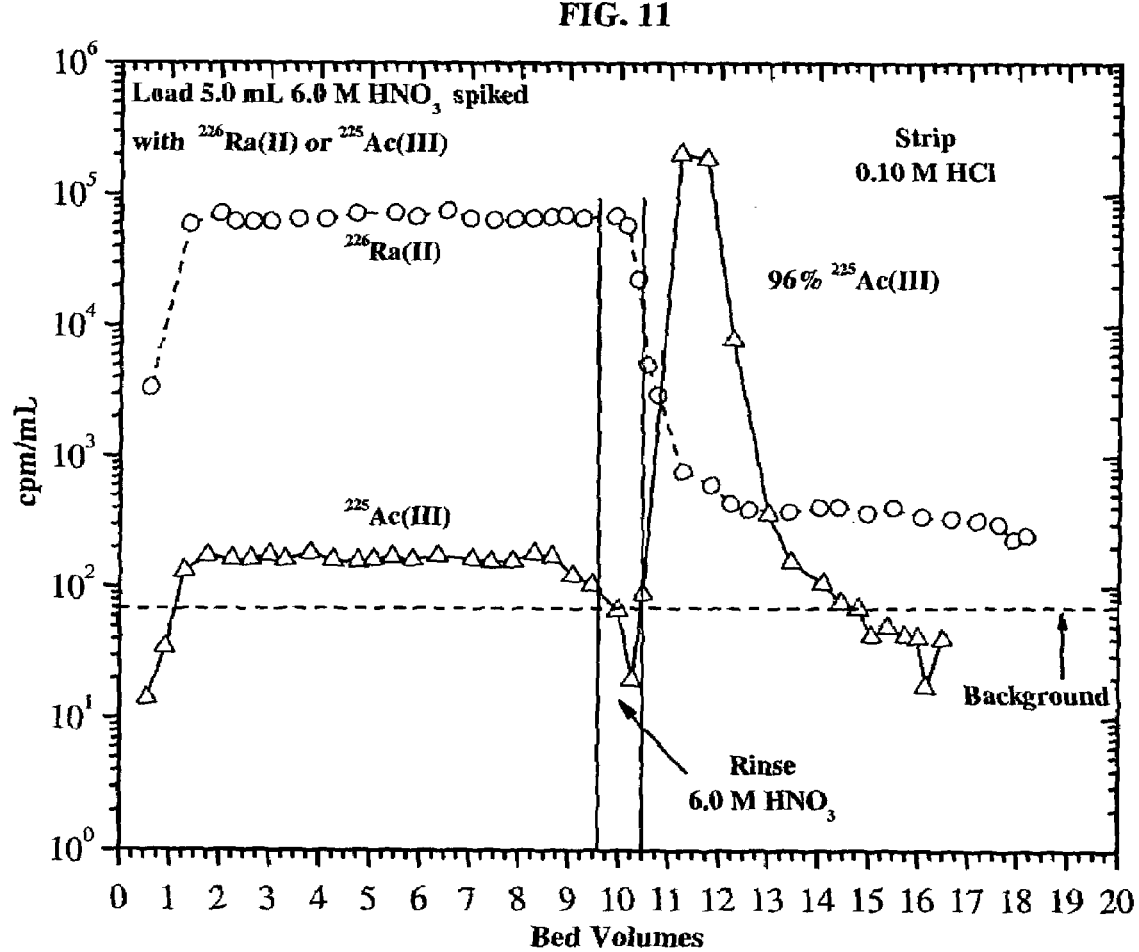
FIG. 11 is a chromatogram showing cpm/mL vs. Bed Volumes of Eluate for the elution of Ra(II) (circles) and Ac(III) (triangles) on a 0.50 mL bed of N,N,N',N'-tetra-n-octyl-DGA resin at 25° C.

FIG. 11 shows the results of a chromatographic study in which the ability of the N,N,N',N'-tetra-n-octyl-DGA resin to separate Ac(III) from Ra(II) present in 6.0 M HNO$_3$ is demonstrated. Over 90% of the Ra(II) is eluted through the first bed volume of rinse, and more extensive rinsing affords a better decontamination from Ra(II) in the Ac(III) stripping regime. Some breakthrough of Ac(III) is observed during the 9.5 bed volumes of load; however, these values are barely statistically significant at just over twice background radiation levels.

Stripping the N,N,N',N'-tetra-n-octyl-DGA resin with 0.10 M HCl removes 96% of the Ac(III) in just five bed volumes. The stripping peak in FIG. 11 shows a maximum decontamination factor (DF) of Ac(III) from Ra(II) of more than 10$^2$, although more extensive rinsing is likely to increase the DF to more than 10$^4$.

EXAMPLE 7

Further Separation Studies

Table 3 summarizes the results of another chromatographic study involving a separation medium comprised of N,N,N',N'-tetra-n-octyl-DGA coated on an inert resin (Amberchrom® CG-71, as discussed previously) and a variety of analytes. During the load phase, ≧90% of Ba(II), Cd(II), Cu(II), and Fe(III) elute in 4 M HNO$_3$, whereas Y(III) and Zr(IV) are strongly retained. Extensive rinsing with 0.5 M HNO$_3$ elutes the remaining quantities of Ba(II), Cd(II), Cu(II), and Fe(III), with no release of Y(III) or Zr(IV). Only after four bed volumes of strip with 0.01 M HCl is the Y(III) substantially eluted, whereas less than 50% of the Zr(IV) is eluted in a broad band covering 10 bed volumes. The ability of N,N,N',N'-tetra-n-octyl-DGA separation medium to efficiently separate Y(III) from Fe(III) is notable, as the latter is ubiquitous in many analytical and commercially important separations.

TABLE 3

Elution of selected cations on N,N,N',N'-tetra-n-octyl-DGA resin.

| Fraction | Bed Vols. | Ba(II) | Cd(II) | Cu(II) | Fe(III) | Y(III) | Zr(IV) |
|---|---|---|---|---|---|---|---|
| Load (4 M HNO$_3$) | 20 | 90 | 93 | 95 | 92 | 0 | 0.9 |
| Rinse (0.5 M HNO$_3$) | 2.0 | 10 | 7 | 3.5 | 7 | 0 | 0.2 |
| | 2.0 | <0.1 | <0.1 | 0.4 | 0.6 | 0 | 0 |
| | 2.0 | <0.1 | 0 | 0.4 | <.1 | 0 | 0 |
| | 2.0 | 0 | 0 | 0.4 | 0.4 | 0 | 0 |
| | 2.0 | 0 | 0 | <0.1 | 0 | 0 | 0 |
| Strip (0.01 M HCl) | 2.0 | 0 | 0 | 0 | 0 | 71 | 5 |
| | 2.0 | 0 | 0 | 0 | 0 | 27 | 10 |
| | 2.0 | 0 | 0 | 0 | 0 | 1 | 11 |
| | 2.0 | 0 | 0 | 0 | 0 | 0.7 | 10 |
| | 2.0 | 0 | 0 | 0 | 0 | 0.3 | 10 |

Column bed volume = 0.5 mL, flow rate = 0.5 mL/minute for load and 0.25 mL/minute for wash and strip Table 4, below, shows the elution behavior of several of the divalent alkaline earth cations on N,N,N',N'-tetra-n-octyl-DGA resin. During the 10 bed volumes of load with 4 M HNO$_3$, the majority of the Mg(II) and Ba(II) elute, whereas Ca(II) and Sr(II) are retained. The remaining Mg(II) and Ba(II) are essentially removed with the first bed volume of rinse with 0.5 M HNO$_3$, and the Sr(II) is shown to elute under these conditions. Interestingly, Ca(II) is retained by the N,N,N',N'-tetra-n-octyl-DGA resin in 0.5 M HNO$_3$, but elutes in a rather broad band in 0.1 M HNO$_3$. The last vestiges of Ca(II) are removed in eight bed volumes of 0.1 M HCl.

TABLE 4

Elution of selected cations on N,N,N',N'-tetra-n-octyl-DGA resin

| Fraction | Bed Vols. | Mg(II) | Ca(II) | Sr(II) | Ba(II) |
|---|---|---|---|---|---|
| Load (4 M HNO$_3$) | 10 | 94 | 1.1 | 0 | 96 |
| Rinse (0.5 M HNO$_3$) | 2 | 2.6 | <0.1 | 1.2 | 4 |
| | 2 | 0.5 | 0 | 96 | 0 |
| | 2 | 0.2 | 0.1 | 2.4 | 0 |
| | 2 | 0.8 | 0.2 | 0.4 | 0 |
| | 2 | 0.5 | 0.2 | <0.1 | 0 |
| Rinse (0.1 M HNO$_3$) | 2 | 0.1 | 28 | <0.1 | 0 |
| | 2 | 0.1 | 63 | 0 | 0 |
| | 2 | 0.1 | 3.4 | 0 | 0 |
| | 2 | 0 | 1.1 | 0 | 0 |
| | 2 | 0 | 1.1 | 0 | 0 |
| Strip (0.1 M HCl) | 4 | 0.1 | 1.1 | 0 | 0 |
| | 4 | 0.1 | 1.1 | 0 | 0 |

Column bed volume = 0.5 mL, flow rate = 0.5 mL/minute for load and 0.25 mL/minute for wash and strip Related data for the N,N,N',N'-tetra-n-octyl-DGA resin have shown that Pb(II) behaves similarly to Sr(II) and that Ra(II) behaves similarly to Ba(II). These data show that, under the appropriate solution conditions, divalent cations can be retained by a separation medium comprised of N,N,N',N'-tetra-n-octyl-DGA resin and that some intra-alkaline earth separations can be effected using that separation medium.

Each of the patents and articles cited herein is incorporated by reference. The use of the article "a" or "an" is intended to include one or more.

The foregoing description and the examples are intended as illustrative and are not to be taken as limiting. Still other variations within the spirit and scope of this invention are possible and will readily present themselves to those skilled in the art.

What is claimed is:

1. A separation medium comprising a diglycolamide extractant corresponding in structure to Formula I dispersed onto a porous inert resin or silica support,

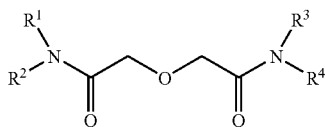

I wherein $R^1$, $R^2$, $R^3$ and $R^4$ are the same or different and are hydrido or hydrocarbyl groups such that $R^1+R^2+R^3+R^4$ contains about 14 to about 56 carbon atoms.

2. The separation medium according to claim 1 wherein said resin is macroreticular.

3. The separation medium according to claim 1 wherein said tetra-substituted diglycolamide extractant comprises about 3 to about 50 weight percent of the total dry weight of the separation medium.

4. The separation medium according to claim 1 wherein $R^1+R^2+R^3+R^4$ contains about 16 to about 40 carbon atoms.

5. A separation medium comprising a diglycolamide extractant corresponding in structure to Formula I dispersed onto a porous inert resin support, said diglycolamide comprising about 3 to about 50 weight percent of the total dry weight of the separation medium,

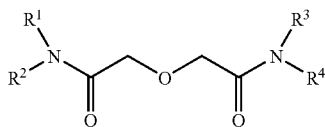

I wherein $R^1$, $R^2$, $R^3$ and $R^4$ are the same or different and are hydrido or hydrocarbyl groups such that $R^1+R^2+R^3+R^4$ contains about 16 to about 40 carbon atoms.

6. The separation medium according to claim 5 wherein each of $R^1$, $R^2$, $R^3$ and $R^4$ is a hydrocarbyl group.

7. The separation medium according to claim 5 wherein said diglycolamide extractant is present dissolved in an organic diluent having a boiling point of about 170 degrees to about 220 degrees C at atmospheric pressure.

8. The separation medium according to claim 7 wherein said diglycolamide extractant is present at about 0.1 to about 1.5 molar.

9. The separation medium according to claim 5 wherein said separation medium is present as free flowing particles.

10. The separation medium according to claim 5 wherein said diglycolamide extractant is present at about 10 to about 40 weight percent of the total dry weight of the separation medium.

11. A separation medium comprising a diglycolamide extractant corresponding in structure to Formula I dispersed onto a porous inert resin support, said diglycolamide comprising about 3 to about 50 weight percent of the total dry weight of the separation medium, said separation medium being present as free flowing particles,

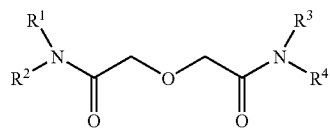

I wherein $R^1$, $R^2$, $R^3$ and $R^4$ are the same or different hydrocarbyl groups such that $R^1+R^2+R^3+R^4$ contains about 16 to about 40 carbon atoms.

12. The separation medium according to claim 11 wherein each of $R^1$, $R^2$, $R^3$ and $R^4$ is an n-octyl group or a 2-ethylhexyl group.

* * * * *